United States Patent
Yang et al.

(10) Patent No.: US 10,735,170 B2
(45) Date of Patent: Aug. 4, 2020

(54) ACK/NACK FEEDBACK METHOD AND USER EQUIPMENT

(71) Applicant: LG ELECTRONICS INC., Seoul (KR)

(72) Inventors: Suckchel Yang, Seoul (KR); Hanbyul Seo, Seoul (KR); Kijun Kim, Seoul (KR); Joonkui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 24 days.

(21) Appl. No.: 15/327,628

(22) PCT Filed: Aug. 6, 2015

(86) PCT No.: PCT/KR2015/008248
§ 371 (c)(1),
(2) Date: Jan. 19, 2017

(87) PCT Pub. No.: WO2016/021957
PCT Pub. Date: Feb. 11, 2016

(65) Prior Publication Data
US 2017/0207895 A1 Jul. 20, 2017

Related U.S. Application Data

(60) Provisional application No. 62/033,664, filed on Aug. 6, 2014.

(51) Int. Cl.
*H04L 5/00* (2006.01)
*H04L 1/20* (2006.01)
(Continued)

(52) U.S. Cl.
CPC .............. *H04L 5/0055* (2013.01); *H04L 1/18* (2013.01); *H04L 1/1822* (2013.01);
(Continued)

(58) Field of Classification Search
CPC ....... H04L 1/18; H04L 5/0048; H04L 5/0055; H04W 72/042; H04W 72/082; H04W 72/085; H04W 88/02
See application file for complete search history.

(56) References Cited

U.S. PATENT DOCUMENTS

2007/0183451 A1   8/2007   Lohr et al.
2008/0227443 A1*  9/2008   Whinnett ............. H04B 1/1027
                                                       455/422.1
(Continued)

FOREIGN PATENT DOCUMENTS

KR   1020140010450   1/2014
WO      2013133607   9/2013

OTHER PUBLICATIONS

PCT International Application No. PCT/KR2015/008248, Written Opinion of the International Searching Authority dated Nov. 24, 2015, 17 pages.

*Primary Examiner* — Andrew Lai
*Assistant Examiner* — M Mostazir Rahman
(74) *Attorney, Agent, or Firm* — Lee Hong Degerman Kang Waimey

(57) ABSTRACT

The present invention provides an HARQ-ACK feedback method and device. User equipment of the present invention detects downlink grant downlink control information and performs HARQ-ACK feedback for downlink data corresponding to the downlink control information. The user equipment processes HARQ-ACK for downlink data as a discontinuous transmission (DTX), when there is interference or noise exceeding a threshold value in the downlink data. Therefore, the user equipment can be prevented from receiving the downlink data having a different redundancy version.

6 Claims, 12 Drawing Sheets

(a)

(b)

(51) Int. Cl.
*H04L 1/18* (2006.01)
*H04W 72/04* (2009.01)
*H04W 72/08* (2009.01)
*H04W 88/02* (2009.01)

(52) U.S. Cl.
CPC .............. *H04L 1/1861* (2013.01); *H04L 1/20* (2013.01); *H04L 5/001* (2013.01); *H04L 5/0048* (2013.01); *H04W 72/042* (2013.01); *H04W 72/082* (2013.01); *H04W 72/085* (2013.01); *H04L 1/1896* (2013.01); *H04W 88/02* (2013.01)

(56) References Cited

U.S. PATENT DOCUMENTS

| | | | |
|---|---|---|---|
| 2011/0249656 A1* | 10/2011 | Cai et al. ................ | H04W 4/00 |
| 2012/0113944 A1 | 5/2012 | Yang et al. | |
| 2014/0036853 A1 | 2/2014 | Kim et al. | |
| 2014/0269453 A1* | 9/2014 | Papasakellariou ... | H04B 7/2643 |
| | | | 370/280 |
| 2015/0189658 A1* | 7/2015 | Zhang .................. | H04B 7/0482 |
| | | | 370/280 |
| 2017/0085326 A1* | 3/2017 | Li ........................ | H04B 17/345 |

\* cited by examiner

PUCCH format 1a and 1b structure (normal CP case)

FIG. 12
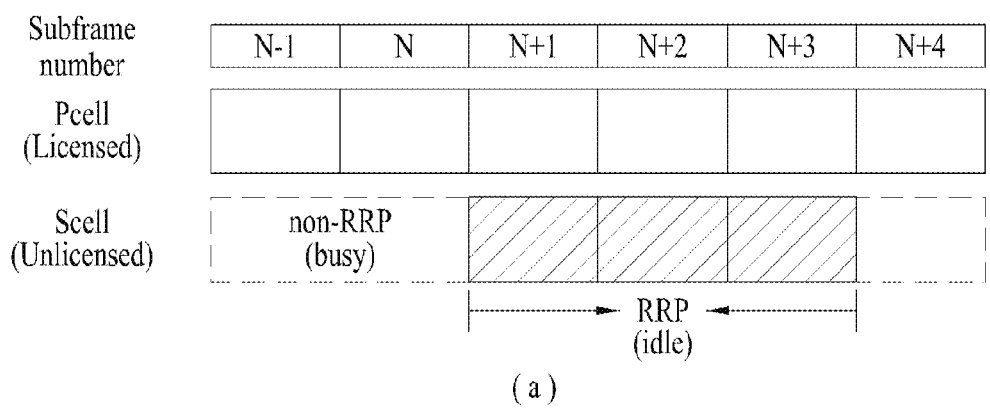
(a)
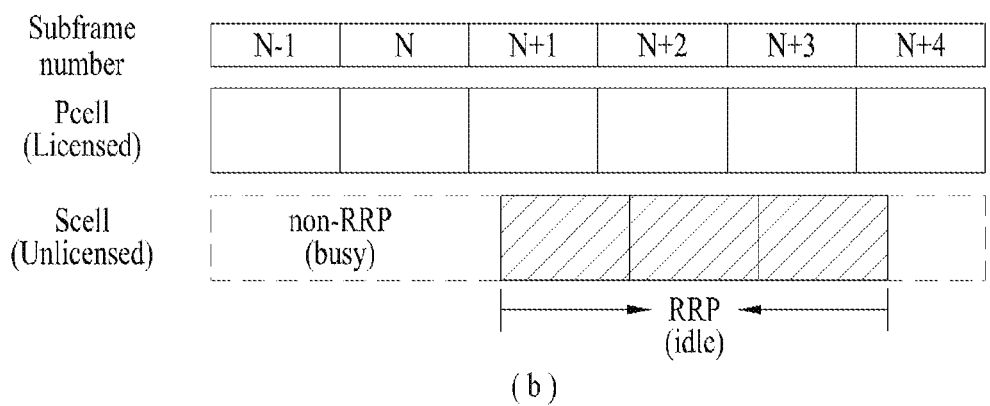
(b)

ACK/NACK FEEDBACK METHOD AND USER EQUIPMENT

CROSS-REFERENCE TO RELATED APPLICATIONS

This application is the National Stage filing under 35 U.S.C. 371 of International Application No. PCT/KR2015/008248, filed on Aug. 6, 2015, which claims the benefit of U.S. Provisional Application No. 62/033,664, filed on Aug. 6, 2014, the contents of which are all hereby incorporated by reference herein in their entirety.

TECHNICAL FIELD

The present invention relates to a wireless communication system and, more particularly, to an ACK/NACK feedback method and an apparatus therefor.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

DETAILED DESCRIPTION OF THE INVENTION

Technical Problems

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

The technical objects that can be achieved through the present invention are not limited to what has been particularly described hereinabove and other technical objects not described herein will be more clearly understood by persons skilled in the art from the following detailed description.

Technical Solutions

The present invention provides a HARQ-ACK feedback method and apparatus. A UE of the present invention detects DL grant DL control information and performs HARQ-ACK feedback for DL data corresponding to the DL control information. The UE may process HARQ-ACK for the DL data as discontinuous transmission (DTX) when there is interference or moise exceeding a threshold value in the DL data.

In as aspect of the present invention, provided herein is a method of performing acknowledgement/negative acknowledgement (ACK/NACK) feedback by a user equipment (UE), comprising: detecting downlink control information (DCI) for a cell configured in an unlicensed band; and receiving downlink (DL) data through a physical downlink shared channel (PDSCH) according to the DCI. The UE may drop transmission of ACK/NACK information about the DL data when an interference level measured from the DL data exceeds a specific threshold value.

For a user equipment (UE) for performing acknowledgement/negative acknowledgement (ACK/NACK) feedback, in another aspect of the present invention, provided the UE comprising: a radio frequency (RF) unit configured to receive or transmit a signal and a processor configured to control the RF unit. The processor may be configured to detect downlink control information (DCI) for a cell configured in an unlicensed band. The processor may be configured to control the RF unit to receive downlink (DL) data through a physical downlink shared channel (PDSCH) according to the DCI. The processor may be configured to drop transmission of ACK/NACK information about the DL data when an interference level measured from the DL data exceeds a specific threshold value.

In each aspect of the present invention, the processor may be configured to control the RF unit to transmit ACK or NACK as the ACK/NACK information according to a result of decoding the DL data when the interference level measured from the DL data is equal to or less than the specific threshold value.

In each aspect of the present invention, the cell may be a cell on which a reference signal used for measurement of the cell is aperiodically transmitted/received.

The above technical solutions are merely some parts of the embodiments of the present invention and various embodiments into which the technical features of the present invention are incorporated can be derived and understood by persons skilled in the art from the following detailed description of the present invention.

Advantageous Effect

According to the present invention, uplink/downlink signals can be efficiently transmitted/received. Therefore, overall throughput of a wireless communication system is improved.

According to an embodiment of the present invention, a new carrier which is not dedicated to a legacy system while maintaining compatibility with the legacy system can be aggregated with a carrier of the legacy system.

According to an embodiment of the present invention, a more efficient response to a received signal can be made.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

FIG. 12 illustrates a subframe configuration of a reserved resource period (RRP).

MODE FOR CARRYING OUT THE INVENTION

Figure 1:
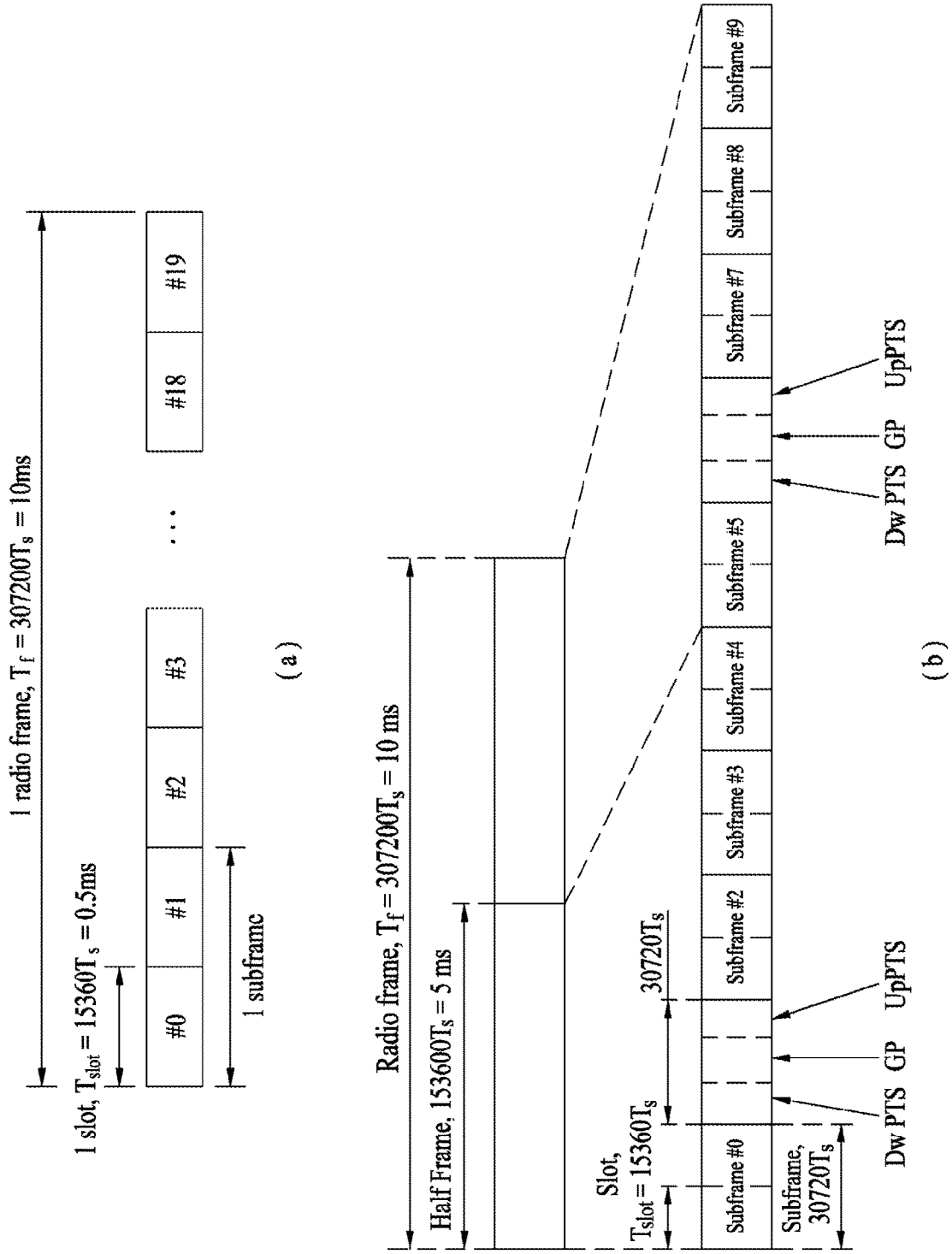
FIG. 1 illustrates the structure of a radio frame used in a wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission thereof, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port, a virtual antenna, or an antenna group. A node may be referred to as a point.

In the present invention, a cell refers to a prescribed geographic region to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. In a LTE/LTE-A based system, The UE may measure DL channel state received from a specific node using cell-specific reference signal(s) (CRS(s)) transmitted on a CRS resource allocated by antenna port(s) of the specific node to the specific node and/or channel state information reference signal(s) (CSI-RS(s)) transmitted on a CSI-RS resource. Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide a service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, coverage of the node may be associated with coverage of "cell" of a radio resource used by the node. Accordingly, the term "cell" may be used to indicate service coverage by the node sometimes, a radio resource at other times, or a range that a signal using a radio resource can reach with valid strength at other times. The "cell" of the radio resource will be described later in more detail.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DMRS) for a UL control/data signal and a sounding reference signal (SRS) used for UL channel measurement are defined as the UL physical signa.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS is assigned or configured will be referred to as CRS/DMRS/CSI-RS/SRS/UE-RS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region.

FIG. 1 illustrates the structure of a radio frame used in a wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A. The frame structure of FIG. 1(a) is referred to as frame structure type 1 (FS1) and the frame structure of FIG. 1(b) is referred to as frame structure type 2 (FS2).

Referring to FIG. 1, a 3GPP LTE/LTE-A radio frame is 10 ms ($307,200T_S$) in duration. The radio frame is divided into 10 subframes of equal size. Subframe numbers may be assigned to the 10 subframes within one radio frame, respectively. Here, $T_S$ denotes sampling time where $T_S=1/(2048*15 \text{ kHz})$. Each subframe is 1ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

In Table 1 shows an exemplary UL-DL configuration within a radio frame in TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. Table 2 shows an example of the special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 2:
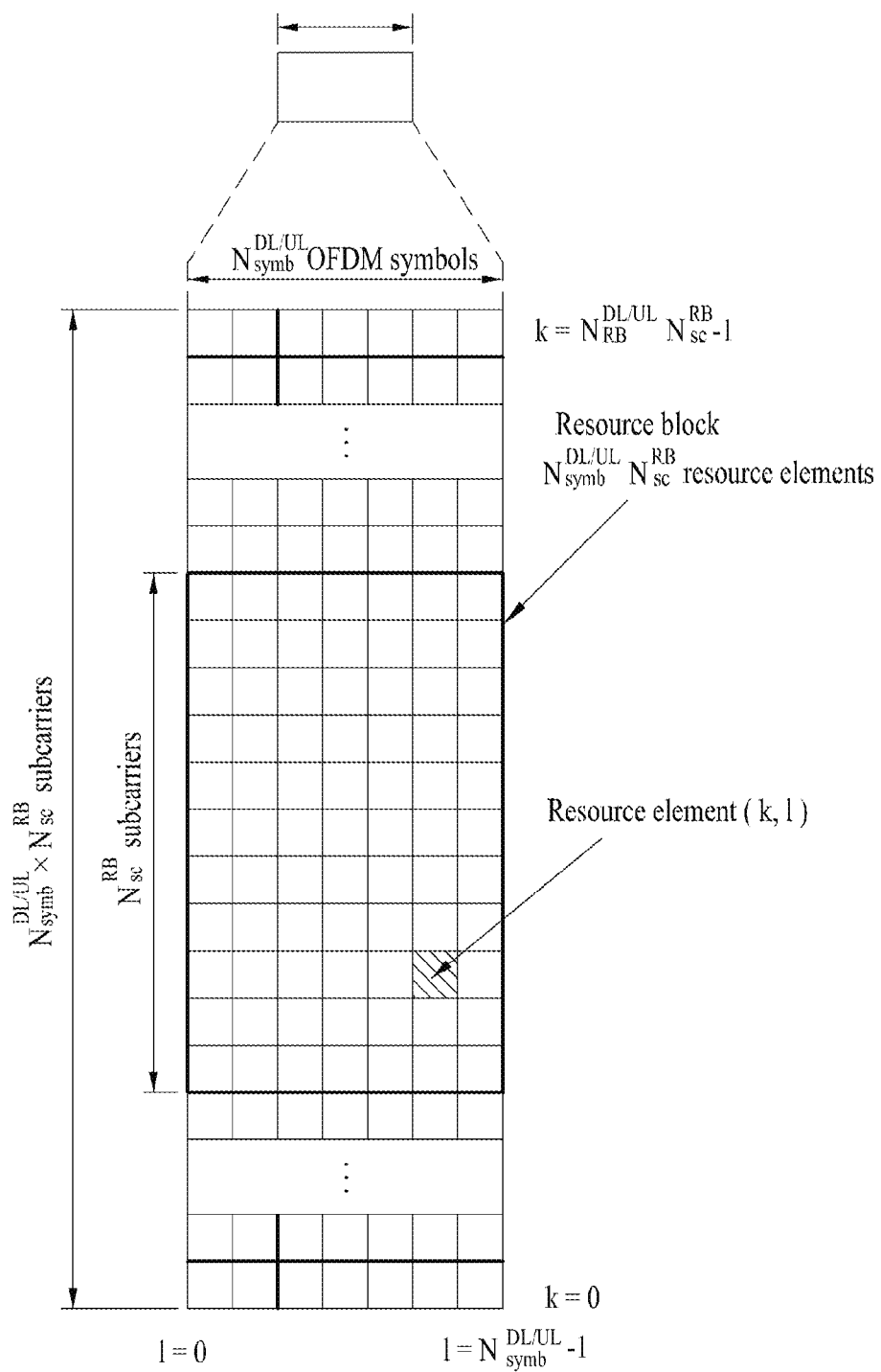
FIG. 2 illustrates the structure of a downlink (DL)/uplink (UL) slot in a wireless communication system.

FIG. 2 illustrates the structure of a DL/UL slot structure in a wireless communication system. In particular, FIG. 2 illustrates the structure of a resource grid of a 3GPP LTE/LTE-A system. One resource grid is defined per antenna port.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB} * N^{RB}_{SC}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{SC}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}_{RB} * N^{RB}_{SC}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

One RB is defined as $N^{DL/UL}_{symb}$ (e.g. 7) consecutive OFDM symbols in the time domain and as $N^{RB}_{SC}$ (e.g. 12) consecutive subcarriers in the frequency domain. For reference, a resource composed of one OFDM symbol and one subcarrier is referred to as a resource element (RE) or tone. Accordingly, one RB includes $N^{DL/UL}_{symb} * N^{RB}_{SC}$ REs. Each RE within a resource grid may be uniquely defined by an index pair (k, l) within one slot. k is an index ranging from 0 to $N^{DL/UL}_{RB} * N^{RB}_{SC} - 1$ in the frequency domain, and l is an index ranging from 0 to $N^{DL/UL}_{symb} - 1$ in the time domain.

Meanwhile, one RB is mapped to one physical resource block (PRB) and one virtual resource block (VRB). A PRB is defined as $N^{DL}_{symb}$ (e.g. 7) consecutive OFDM or SC-FDM symbols in the time domain and $N^{RB}_{SC}$ (12) consecutive subcarriers in the frequency domain. Accordingly, one PRB is configured with $N^{DL/UL}_{symb} * N^{RB}_{SC}$ REs. In one subframe, two RBs each located in two slots of the subframe while occupying the same $N^{RB}_{SC}$ consecutive subcarriers are referred to as a physical resource block (PRB) pair. Two RBs configuring a PRB pair have the same PRB number (or the same PRB index).

Figure 3:
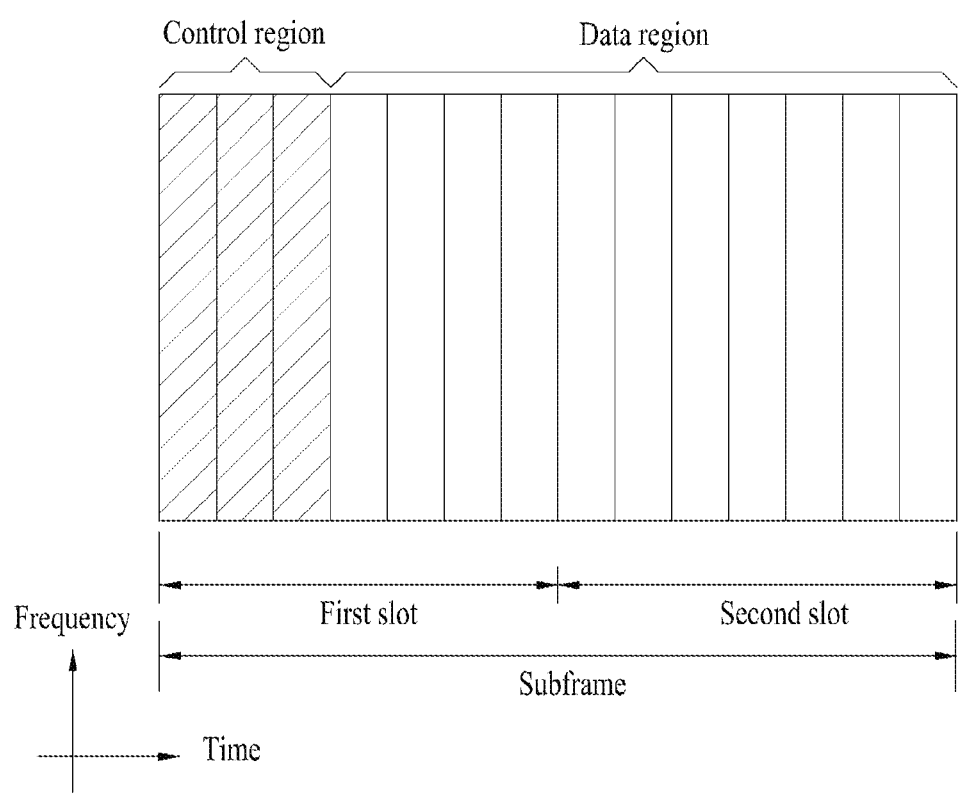
FIG. 3 illustrates the structure of a DL subframe used in a wireless communication system.

FIG. 3 illustrates the structure of a DL subframe used in a wireless communication system.

Figure 4:
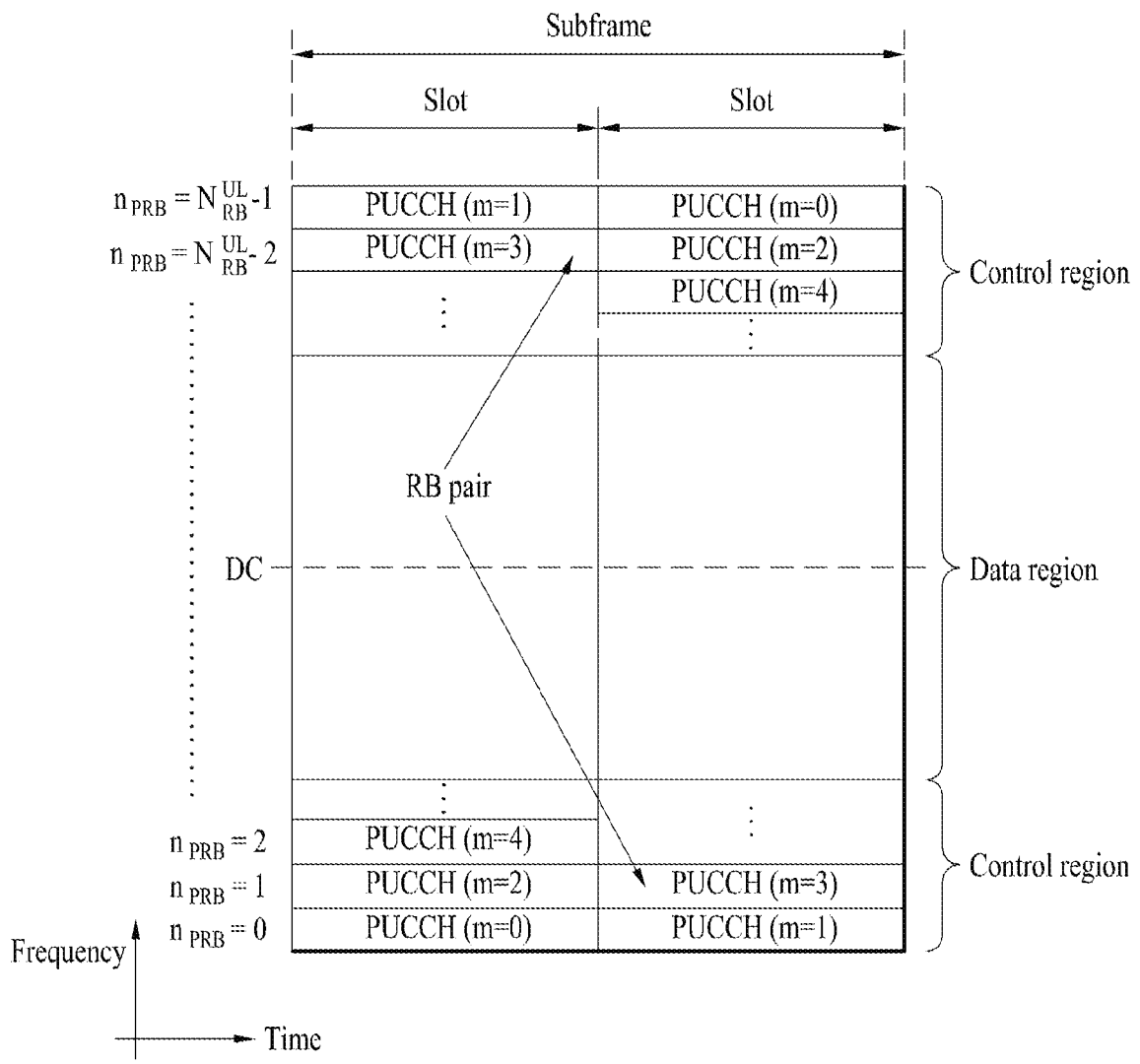
FIG. 4 illustrates the structure of a UL subframe used in a wireless communication system.

Referring to FIG. 4, a DL subframe is divided into a control region and a data region in the time domain. Referring to FIG. 4, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region. Examples of a DL control channel used in 3GPP LTE include a physical control format indicator channel (PCFICH), a physical downlink control channel (PDCCH), a physical hybrid ARQ indicator channel (PHICH), etc. The PCFICH is transmitted in the first OFDM symbol of a subframe and carries information about the number of OFDM symbols available for transmission of a control channel within a subframe. The PHICH carries a HARQ (Hybrid Automatic Repeat Request) ACK/NACK (acknowledgment/negative-acknowledgment) signal as a response to UL transmission.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI.

A plurality of PDCCHs may be transmitted within a control region. A UE may monitor the plurality of PDCCHs. An eNB determines a DCI format depending on the DCI to be transmitted to the UE, and attaches cyclic redundancy check (CRC) to the DCI. The CRC is masked (or scrambled) with an identifier (for example, a radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at the bit level.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, one CCE corresponds to nine resource element groups (REGs), and one REG corresponds to four REs. Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH). A PDCCH format and the number of DCI bits are determined in accordance with the number of CCEs. The CCEs are numbered and consecutively used. To simplify the decoding process, a PDCCH having a format including n CCEs may be initiated only on CCEs assigned numbers corresponding to multiples of n. The number of CCEs used for transmission of a specific PDCCH is determined by a network or the eNB in accordance with channel status. For example, one CCE may be required for a PDCCH for a UE (for example, adjacent to eNB) having a good downlink channel. However, in case of a PDCCH for a UE (for example, located near the cell edge) having a poor channel, eight CCEs may be required to obtain sufficient robustness. Additionally, a power level of the PDCCH may be adjusted to correspond to a channel status.

In a 3GPP LTE/LTE-A system, a CCE set in which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined as the SS. SSs for respective PDCCH formats may have different sizes and a dedicated SS and a common SS are defined. The dedicated SS is a UE-specific SS (USS) and is configured for each individual UE. The common SS (CSS) is configured for a plurality of UEs.

An eNB transmits an actual PDCCH (DCI) on a PDCCH candidate in a search space and a UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

For example, it is assumed that a specific PDCCH is CRC-masked with a radio network temporary identity (RNTI) "A" and information about data transmitted using a radio resource "B" (e.g. frequency location) and using transport format information "C" (e.g. transport block size, modulation scheme, coding information, etc.) is transmitted in a specific DL subframe. Then, the UE monitors the PDCCH using RNTI information thereof. The UE having the RNTI "A" receives the PDCCH and receives the PDSCH indicated by "B" and "C" through information of the received PDCCH.

FIG. 4 illustrates the structure of a UL subframe used in a wireless communication system.

Referring to FIG. 4, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. CSI may include channel quality information (CQI), a precoding matrix indicator (PMI), a precoding type indicator, and/or a rank indicator (RI). In the CSI, multiple input multiple output (MIMO)-related feedback information includes the RI and the PMI. The RI indicates the number of streams or the number of layers that the UE can receive through the same time-frequency resource. The PMI is a value reflecting a space characteristic of a channel, indicating an index of a precoding matrix preferred by a UE for DL signal transmission based on a metric such as an SINR. The CQI is a value of channel strength, indicating a received SINR that can be obtained by the UE generally when an eNB uses the PMI.

Figure 5:
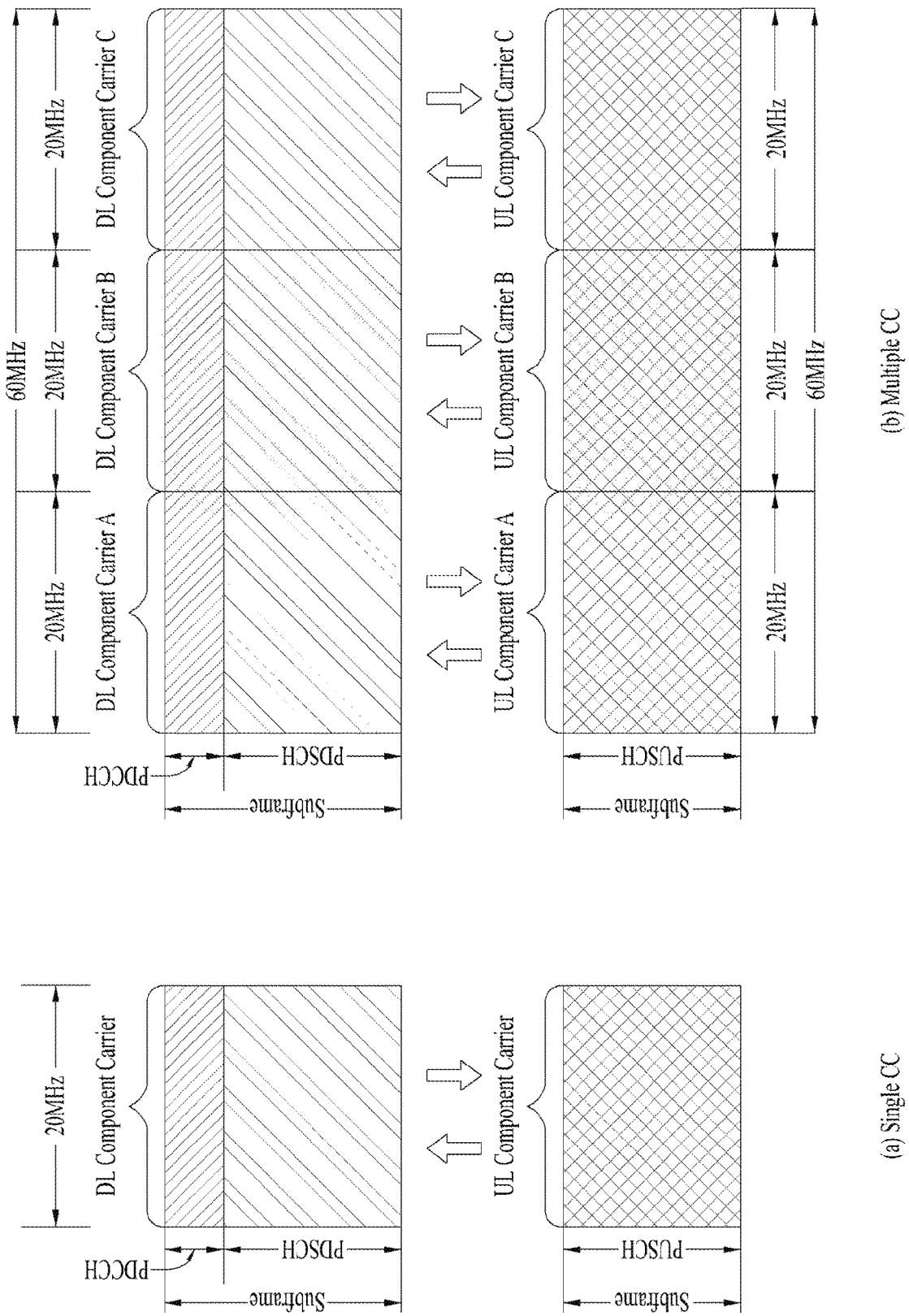
FIG. 5 is a diagram for explaining single-carrier communication and multi-carrier communication.

FIG. 5 is a diagram for explaining single-carrier communication and multi-carrier communication. Specially, FIG. 5(a) illustrates a subframe structure of a single carrier and FIG. 5(b) illustrates a subframe structure of multiple carriers.

Referring to FIG. 5(a), a general wireless communication system transmits/receives data through one downlink (DL) band and through one uplink (UL) band corresponding to the DL band (in the case of frequency division duplex (FDD) mode), or divides a prescribed radio frame into a UL time unit and a DL time unit in the time domain and transmits/receives data through the UL/DL time unit (in the case of time division duplex (TDD) mode). Recently, to use a wider frequency band in recent wireless communication systems, introduction of carrier aggregation (or BW aggregation) technology that uses a wider UL/DL BW by aggregating a plurality of UL/DL frequency blocks has been discussed. A carrier aggregation (CA) is different from an orthogonal frequency division multiplexing (OFDM) system in that DL or UL communication is performed using a plurality of carrier frequencies, whereas the OFDM system carries a base frequency band divided into a plurality of orthogonal subcarriers on a single carrier frequency to perform DL or UL communication. Hereinbelow, each of carriers aggregated by carrier aggregation will be referred to as a component carrier (CC). Referring to FIG. 5(b), three 20 MHz CCs in each of UL and DL are aggregated to support a BW of 60 MHz. The CCs may be contiguous or non-contiguous in the frequency domain. Although FIG. 5(b) illustrates that a BW of UL CC and a BW of DL CC are the same and are symmetrical, a BW of each component carrier may be defined independently. In addition, asymmetric carrier aggregation where the number of UL CCs is different from the number of DL CCs may be configured. A DL/UL CC for a specific UE may be referred to as a serving UL/DL CC configured at the specific UE.

In the meantime, the 3GPP LTE-A system uses a concept of cell to manage radio resources. The cell is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the S cell on the downlink will be referred to as downlink secondary CC (DL SCC), and the carrier corresponding to the S cell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

The eNB may activate all or some of the serving cells configured in the UE or deactivate some of the serving cells for communication with the UE. The eNB may change the activated/deactivated cell, and may change the number of cells which is/are activated or deactivated. If the eNB allocates available cells to the UE cell-specifically or UE-specifically, at least one of the allocated cells is not deactivated unless cell allocation to the UE is fully reconfigured or unless the UE performs handover. Such a cell which is not deactivated unless CC allocation to the UE is full reconfigured will be referred to as Pcell, and a cell which may be activated/deactivated freely by the eNB will be referred to as Scell. The Pcell and the Scell may be identified from each other on the basis of the control information. For example, specific control information may be set to be transmitted and received through a specific cell only. This specific cell may be referred to as the Pcell, and the other cell(s) may be referred to as Scell(s).

Figure 6:
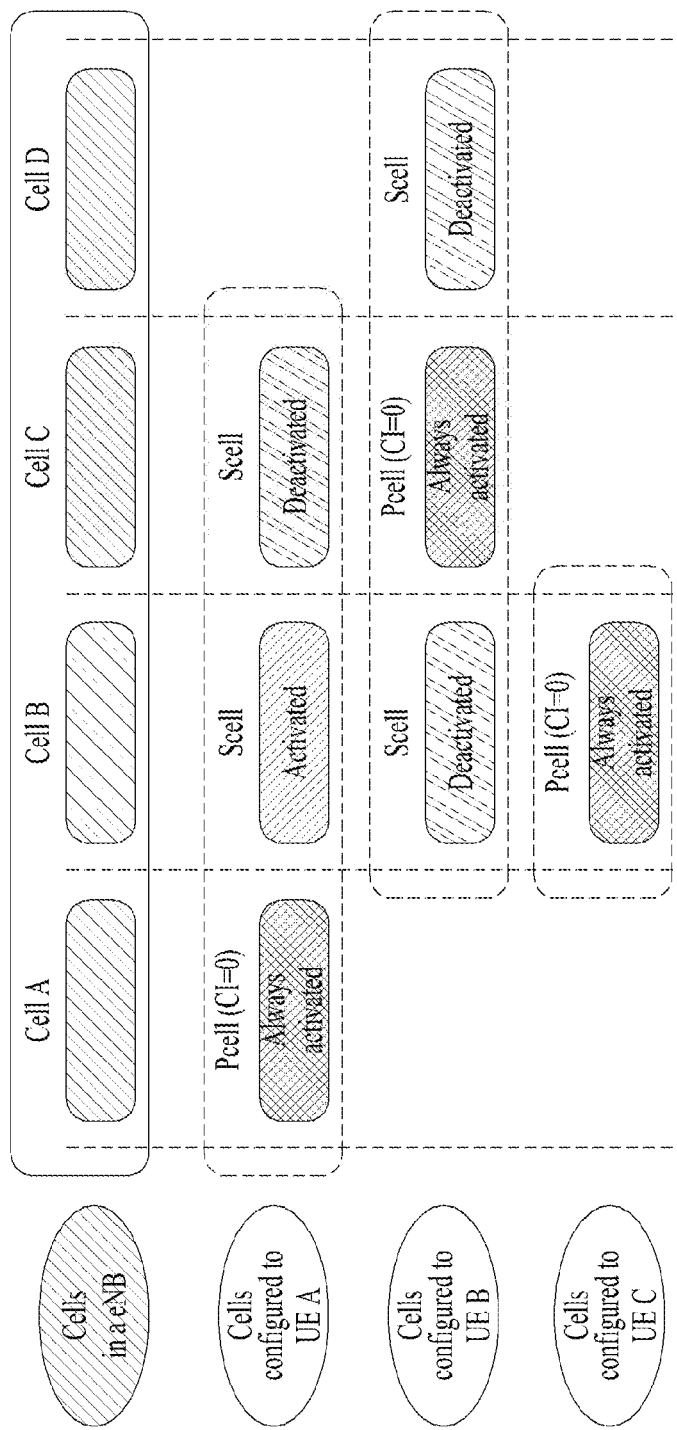
FIG. 6 illustrates the state of cells in a system supporting CA.

FIG. 6 illustrates the state of cells in a system supporting CA.

In FIG. 6, a configured cell refers to a cell in which CA is performed for a UE based on measurement report from another eNB or UE among cells of an eNB and is configured for each UE. The configured cell for the UE may be a serving cell in terms of the UE. The configured cell for the UE, i.e. the serving cell, pre-reserves resources for ACK/NACK transmission for PDSCH transmission. An activated cell refers to a cell configured to be actually used for PDSCH/PUSCH transmission among configured cells for the UE and CSI reporting and SRS transmission for PDSCH/PUSCH transmission are performed on the activated cell. A deactivated cell refers to a cell configured not to be used for PDSCH/PUSCH transmission by the command of an eNB or the operation of a timer and CSI reporting and SRS transmission are stopped on the deactivated cell. For reference, in FIG. 6, CI denotes a serving cell index and CI=0 is applied to Pcell. The serving cell index is a short ID used to identify the serving cell and, for example, any one of integers from 0 to 'maximum number of carrier frequencies which can be configured for the UE at a time minus 1' may be allocated to one serving cell as the serving cell index. That is, the serving cell index may be a logical index used to identify a specific serving cell among cells allocated to the UE rather than a physical index used to identify a specific carrier frequency among all carrier frequencies.

As described above, the term "cell" used in carrier aggregation is differentiated from the term "cell" indicating a certain geographical area where a communication service is provided by one eNB or one antenna group.

The cell mentioned in the present invention means a cell of carrier aggregation which is combination of UL CC and DL CC unless specifically noted.

Meanwhile, since one serving cell is only present in case of communication based on a single carrier, a PDCCH carrying UL/DL grant and corresponding PUSCH/PDSCH are transmitted on one cell. In other words, in case of FDD under a single carrier environment, a PDCCH for a DL grant for a PDSCH, which will be transmitted on a specific DL CC, is transmitted on the specific CC, and a PDCCH for a UL grant for a PUSCH, which will be transmitted on a specific UL CC, is transmitted on a DL CC linked to the specific UL CC. In case of TDD under a single carrier environment, a PDCCH for a DL grant for a PDSCH, which will be transmitted on a specific DL CC, is transmitted on the specific CC, and a PDCCH for a UL grant for a PUSCH, which will be transmitted on a specific UL CC, is transmitted on the specific CC.

On the contrary, since a plurality of serving cells may be configured in a multi-carrier system, transmission of UL/DL grant through a serving cell having a good channel status may be allowed. In this way, if a cell carrying UL/DL grant which is scheduling information is different from a cell where UL/DL transmission corresponding to the UL/DL grant is performed, this will be referred to as cross-carrier scheduling.

Hereinafter, the case where the cell is scheduled from itself and the case where the cell is scheduled from another cell will be referred to as self-CC scheduling and cross-CC scheduling, respectively.

For data transmission rate enhancement and stable control signaling, the 3GPP LTE/LTE-A may support aggregation of a plurality of CCs and a cross carrier-scheduling operation based on the aggregation.

If cross-carrier scheduling (or cross-CC scheduling) is applied, a PDCCH for downlink allocation for a DL CC B or DL CC C, that is, carrying a DL grant may be transmitted through a DL CC A, and a corresponding PDSCH may be transmitted through the DL CC B or DL CC C. For cross-CC scheduling, a carrier indicator field (CIF) may be introduced. The presence or absence of the CIF within the PDCCH may be semi-statically and UE-specifically (or UE-group-specifically) configured by higher layer signaling (e.g., RRC signaling). The baseline of PDCCH transmission is summarized as below.

CIF disabled: A PDCCH on a DL CC assigns PDSCH resources on the same DL CC or PUSCH resources on a single linked UL CC No CIF Same as an LTE PDCCH structure (same coding and same CCE-based resource mapping) and as a DCI format CIF enabled: a PDCCH on a DL CC can assign PDSCH/PUSCH resources on a specific DL/UL CC among a plurality of aggregated DL/UL CCs using a CIF.

Extended LTE DCI format with CIF

CIF (if configured) is a fixed x-bit field (e.g. x=3).

CIF (if configured) location is fixed regardless of DCI format size.

Reuse of the LTE PDCCH structure (same coding and same CCE-based resource mapping)

One or more scheduling cells may be configured for one UE and one of the scheduling cells may be a PCC which is in charge of specific DL control signaling and UL PUCCH transmission. A scheduling cell set may be configured UE-specifically, UE-group-specifically, or cell-specifically. The scheduling cell may be configured so as to directly schedule at least itself. That is, the scheduling cell may become a scheduled cell thereof. In the present invention, a cell carrying a PDCCH is referred to as a scheduling cell, a monitoring cell, or an MCC and a cell carrying a PDSCH/PUSCH scheduled by the PDCCH is referred to as a scheduled cell.

The scheduling cell includes a DL CC as a part of all carrier aggregated cells. The UE detects/decodes the PDCCH only on a corresponding DL CC. In this case, a PDSCH/PUSCH of the scheduling cell or a scheduled cell refers to a PDSCH/PUSCH configured to be transmitted on the corresponding cell. A PHICH of the scheduling cell or the scheduled cell refers to a PHICH carrying ACK/NACK for a PUSCH transmitted on the corresponding cell.

HARQ is a method used for error control. HARQ-ACK transmitted in DL is used for error control regarding UL data and HARQ-ACK transmitted in UL is used for error control regarding DL data. In DL, an eNB schedules one or more RBs for a UE selected according to a predetermined scheduling rule and transmits data to the UE using the scheduled RBs. Hereinafter, scheduling information for DL transmission will be referred to as a DL grant and a PDCCH carrying the DL grant will be referred to as a DL grant PDCCH. In UL, the eNB schedules one or more RBs for a UE selected according to a predetermined scheduling rule and the UE transmits data using allocated resources in UL. A transmitting device performing a HARQ operation waits for an ACK signal after transmitting data (e.g. transport blocks or codewords). A receiving device performing the HARQ operation transmits an ACK signal only when the data has been correctly received and transmits a NACK signal when there is an error in the received data. Upon receiving the ACK signal, the transmitting device transmits next (new) data but, upon receiving the NACK signal, the transmitting device retransmits data. In a HARQ scheme, error data is stored in a HARQ buffer and initial data is combined with retransmission data in order to raise reception success rate.

The present invention proposes a method in which the UE feeds back a result of a HARQ operation to the eNB or other transmission devices in performing the HARQ operation and performs an operation based on HARQ feedback. Upon receiving a data signal using a specific time/frequency resource, the UE confirms whether the data signal has correctly been received. If the data signal has correctly been received, the UE feeds back ACK and, if not, the UE feeds back NACK. For example, the UE may confirm whether the data signal has correctly been received by decoding the received data signal and checking a CRC of the decoded signal. As a result of checking the CRC, if it is determined that the data signal has successfully been decoded, the UE may feed back ACK as HARQ-ACK for the data signal and, if it is determined that the data signal has unsuccessfully been decoded (i.e. failure), the UE may feed back NACK as HARQ-ACK for the data signal. If ACK is reported, the eNB or transmission device may determine that the data signal has successfully been received by the UE. If another data signal is present for the UE, the eNB may transmit scheduling information for the other data signal and transmit the other data signal according to the scheduling information. On the other hand, if NACK is reported, the eNB or transmission device may transmit a signal capable of being used to recover corresponding data (hereinafter, a recovery signal) so that the UE may recover erroneous data into original data. For example, the transmission device transmits, as the recovery signal, parity bit(s) for a data signal reported as having an error to the UE that has reported NACK. Upon failing to recover a data signal, the UE stores a received signal in a HARQ buffer. If the UE receives the recovery signal later, the UE may combine the received signal with the recovery signal. Hereinafter, the recovery signal will be referred to as a retransmission signal or retransmission data and an initially transmitted original signal rather than a signal transmitted as the recovery signal by the transmission device will be referred to as an initial signal or initial data.

With introduction of M2M technology, multi-node systems, carrier aggregation, TDD, etc., a method for effectively transmitting a large amount of ACK/NACK information at one time has been demanded. The present invention proposes a method for effectively transmitting UL ACK/NACK information. First, the terms used in association with UL ACK/NACK information transmission of the present invention are summarized below.

HARQ-ACK (Hybrid Automatic Repeat reQuest Acknowledgement): This represents a reception response result to DL transmission (e.g. PDSCH or SPS release PDCCH), i.e. an ACK/NACK/DTX response (simply, ACK/NACK response, ACK/NACK, A/N response, or A/N). The ACK/NACK response refers to ACK, NACK, DTX, or NACK/DTX. HARQ-ACK for a CC or HARQ-ACK of a CC refers to an ACK/NACK response to DL transmission related to the CC (e.g. scheduled for the CC). A PDSCH may be replaced with a transport block or a codeword.

PDSCH: This corresponds to a DL grant PDCCH. The PDSCH is used interchangeably with a PDSCH with a PDCCH in this specification.

SPS release PDCCH: This refers to a PDCCH indicating SPS release. A UE feeds back ACK/NACK information about the SPS release PDCCH on UL.

SPS PDSCH: This refers to a PDSCH transmitted on DL using resources configured semi-statically by SPS. The SPS PDSCH has no DL grant PDCCH corresponding thereto. In this specification, the SPS PDSCH is used interchangeably with a PDSCH without a PDCCH.

PUCCH index: This corresponds to a PUCCH resource. A PUCCH index indicates, for example, a PUCCH resource index. The PUCCH resource index is mapped to at least one of an orthogonal cover (OC), a cyclic shift (CS), and a PRB.

ARI (ACK/NACK Resource Indicator): This is used to indicate a PUCCH resource. For example, the ARI may be used to indicate a resource change value (e.g. offset) for a specific PUCCH resource (group) (configured by a higher layer). As another example, the ARI may be used to indicate a specific PUCCH resource (group) index in a PUCCH resource (group) set (configured by a higher layer). The ARI may be included in a TPC field of a PDCCH corresponding to a PDSCH on an SCC. PUCCH power control is performed through a TPC field in a PDCCH that schedules a PCC (i.e. PDCCH corresponding to a PDSCH on a PCC). The ARI may be included in a TPC field of a PDCCH other than a PDCCH that has a downlink assignment index (DAI) initial value and schedules a specific cell (e.g. PCell). The ARI is used interchangeably with a HARQ-ACK resource indication value.

DAI (Downlink Assignment Index): This is included in DCI transmitted over a PDCCH. The DAI may indicate an order value or a counter value of a PDCCH. For convenience, a value indicated by a DAI field of a DL grant PDCCH is referred to as a DL DAI and a value indicated by a DAI field of a UL grant PDCCH is referred to as a UL DAI.

Implicit PUCCH resource: This represents a PUCCH resource/index linked to the lowest CCE index of a PDCCH that schedules a PCC or is transmitted on the PCC.

Explicit PUCCH resource: This may be indicated using an ARI.

PDCCH that schedules a CC: This indicates a PDCCH that schedules a PDSCH or a PUSCH on the CC. That is, the PDCCH that schedules a CC refers to a PDCCH corresponding to a PDSCH or a PUSCH on the CC.

PCC (Primary Component Carrier) PDCCH: This represents a PDCCH that schedules a PCC. That is, the PCC PDCCH represents a PDCCH corresponding to a PDSCH or a PUSCH on the PCC. The PCC PDCCH is transmitted only on the PCC on the assumption that cross-CC scheduling is not performed for the PCC.

SCC (Secondary Component Carrier) PDCCH: This represents a PDCCH that schedules an SCC. That is, the SCC PDCCH represents a PDCCH corresponding to a PDSCH or a PUSCH on the SCC. When cross-CC scheduling is permitted for the SCC, the SCC PDCCH may be transmitted on a CC other than the SCC (e.g. on a PCC or another SCC). When cross-CC scheduling is not permitted for the SCC, the SCC PDCCH is transmitted only on the SCC.

Cross-CC scheduling: This refers to an operation of transmitting a PDCCH that schedules an SCC on a CC other than the SCC (e.g. on a PCC or another SCC). When only two CCs of a PCC and an SCC are present, cross-CC scheduling refers to an operation of scheduling/transmitting all PDCCHs only on one PCC.

Non-cross-CC scheduling: This represents an operation of scheduling/transmitting a PDCCH that schedules each CC on the CC.

Figure 7:
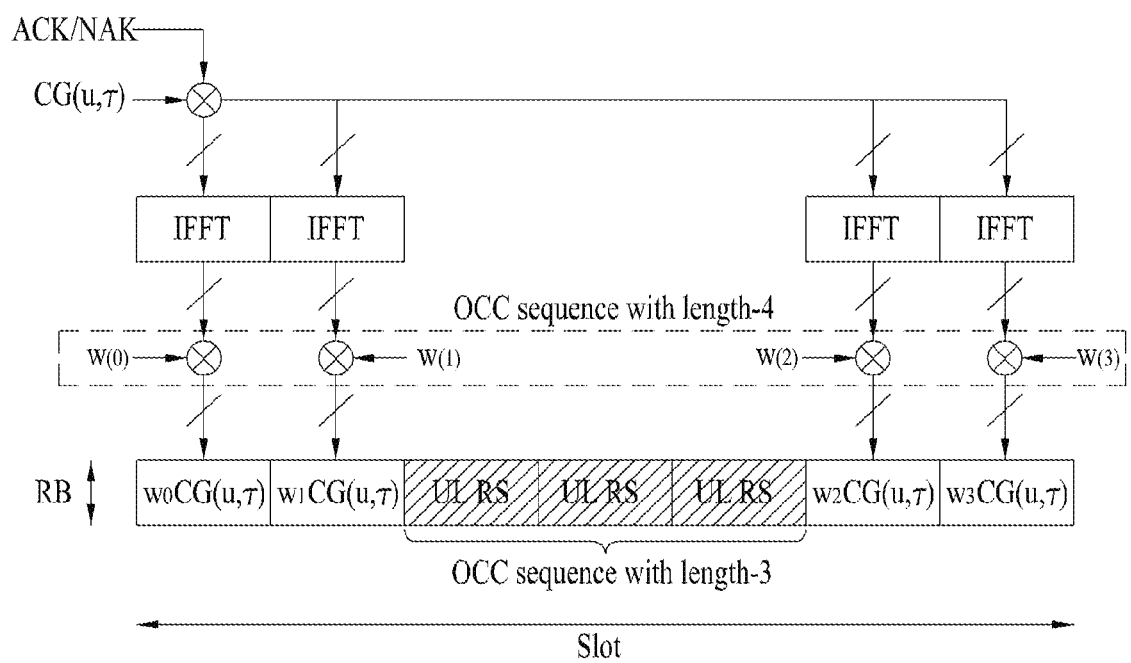
FIG. 7 illustrates slot level structures of a PUCCH format.

FIG. 7 exemplarily shows slot level structures of a PUCCH format. Particularly, FIG. 7 shows the PUCCH format 1a and 1b structure in case of a normal CP.

In the PUCCH format 1a and 1b structure, the same control information is repeated per slot within a subframe. In each UE, the ACK/NACK signal may be transmitted through different resources that are comprised of different cyclic shifts (i.e., different frequency domain codes) of a Computer-Generated Constant Amplitude Zero Auto Correlation (CG-CAZAC) sequence and different resources composed of orthogonal cover or orthogonal cover code (OC or OCC). For example, OC may include a Walsh/DFT orthogonal code. Provided that the number of CSs is 6 and the number of OCs is 3, a total of 18 UEs may be multiplexed in the same PRB on the basis of one antenna. Orthogonal sequences [w(0) w(1) w(2) w(3)] may be applied to either an arbitrary time domain (after FFT modulation) or an arbitrary frequency domain (before FFT modulation).

For an SR and persistent scheduling, ACK/NACK resources including CSs, OC sequences, and PRBs may be provided to a UE through RRC. For dynamic ACK/NACK and non-persistent scheduling, ACK/NACK resources may be implicitly provided to the UE by the lowest Control Channel Element (CCE) index of a PDCCH corresponding to a PDSCH.

Figure 8:
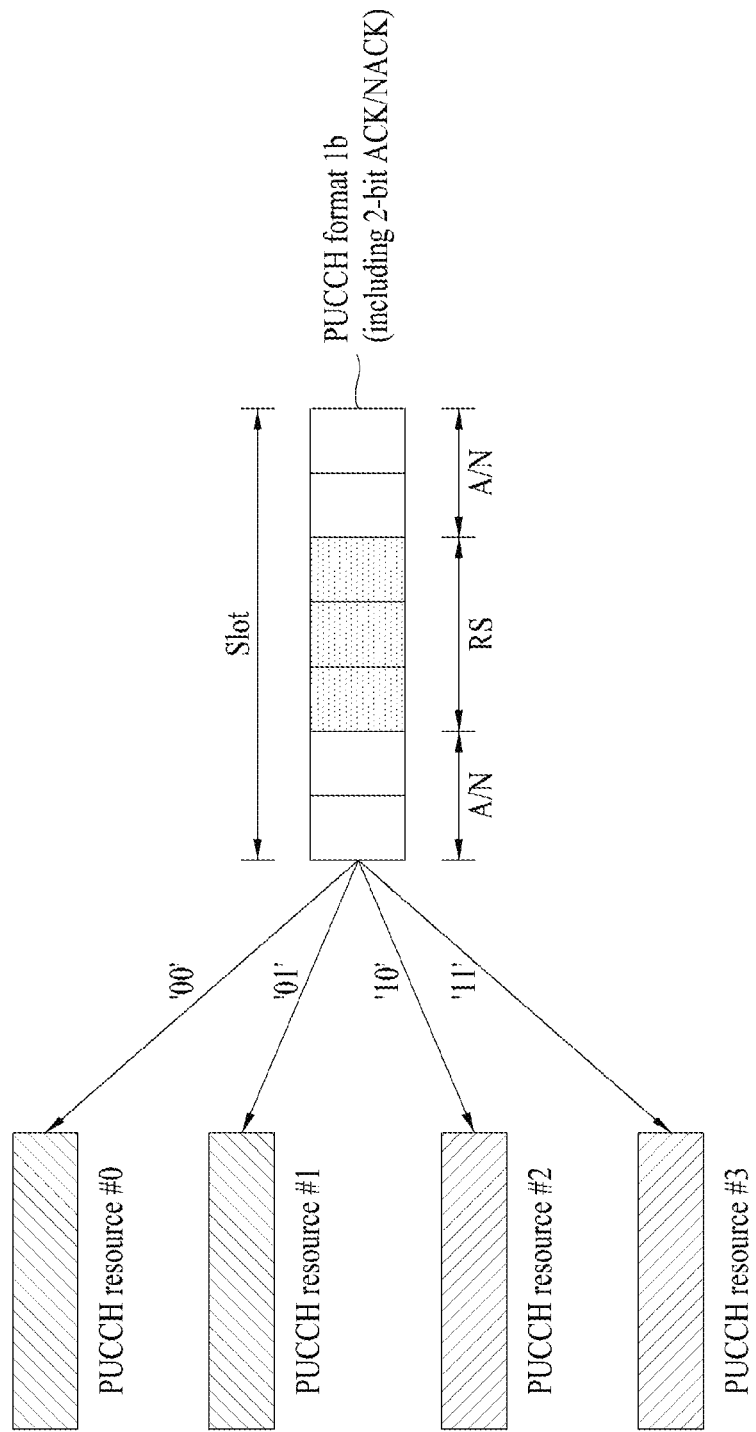
FIG. 8 illustrates ACK/NACK transmission based on channel selection.

FIG. 8 shows exemplary ACK/NACK transmission based on channel selection.

A scheme for transmitting information by data constellation and by selection of specific resources among a plurality of resources defined using RSs and data is referred to as a channel selection transmission scheme.

Referring to FIG. 8, four PUCCH resources (PUCCH resources #0 to #4) may be configured for PUCCH format 1b for 2-bit ACK/NACK feedback. If 4-bit ACK/NACK information is transmitted, 2 bits among the 4-bit ACK/NACK information may be expressed through 2-bit information carried by PUCCH format 1b and the other 2 bits may be expressed according to which resource of the four resources is selected. For example, it may be predefined that transmission of UCI using PUCCH resource #0 indicates '00' and transmission of the UCI using PUCCH resource #1 indicates '01'. Therefore, since two bits (00, 01, 10, or 11) may be expressed by selecting one of the four PUCCH resources, additional 2-bit ACK/NACK information may be expressed in addition to 2-bit ACK/NACK information expressed through PUCCH format 1b.

Which bit should be transmitted on which PUCCH resource may be predetermined according to ACK/NACK states. That is, a mapping table of ACK/NACK state versus PUCCH resources versus transmission bits (or complex modulation symbols) may be predefined and may be pre-stored in a BS and a UE.

According to a predefined mapping table, the UE may inform the eNB of an ACK/NACK state by transmitting, in subframe n, transmission bit(s) b(0)b(1) using PUCCH format 1b on a PUCCH resource on $n^{(1)}_{PUCCH}$ selected from among A PUCCH resources $n^{(1)}_{PUCCH,j}$ (where $0 \leq j \leq A-1$). The following tables illustrate mapping tables for selecting a PUCCH format 1b HARQ-ACK transmission channel to select a PUCCH resource from among A PUCCH resources.

TABLE 3

Transmission of Format 1b HARQ-ACK channel selection for A = 4

| HARQ-ACK(0) | HARQ-ACK(1) | HARQ-ACK(2) | HARQ-ACK(3) | $n^{(1)}_{PUCCH}$ | b(0)b(1) |
|---|---|---|---|---|---|
| ACK | ACK | ACK | ACK | $n^{(1)}_{PUCCH,1}$ | 1, 1 |
| ACK | NACK/DTX | ACK | ACK | $n^{(1)}_{PUCCH,2}$ | 0, 1 |
| NACK/DTX | ACK | ACK | ACK | $n^{(1)}_{PUCCH,1}$ | 0, 1 |
| NACK/DTX | NACK/DTX | ACK | ACK | $n^{(1)}_{PUCCH,3}$ | 1, 1 |
| ACK | ACK | ACK | NACK/DTX | $n^{(1)}_{PUCCH,1}$ | 1, 0 |
| ACK | NACK/DTX | ACK | NACK/DTX | $n^{(1)}_{PUCCH,2}$ | 0, 0 |
| NACK/DTX | ACK | ACK | NACK/DTX | $n^{(1)}_{PUCCH,1}$ | 0, 0 |
| NACK/DTX | NACK/DTX | ACK | NACK/DTX | $n^{(1)}_{PUCCH,3}$ | 1, 0 |
| ACK | ACK | NACK/DTX | ACK | $n^{(1)}_{PUCCH,2}$ | 1, 1 |
| ACK | NACK/DTX | NACK/DTX | ACK | $n^{(1)}_{PUCCH,2}$ | 1, 0 |
| NACK/DTX | ACK | NACK/DTX | ACK | $n^{(1)}_{PUCCH,3}$ | 0, 1 |
| NACK/DTX | NACK/DTX | NACK/DTX | ACK | $n^{(1)}_{PUCCH,3}$ | 0, 0 |
| ACK | ACK | NACK/DTX | NACK/DTX | $n^{(1)}_{PUCCH,0}$ | 1, 1 |
| ACK | NACK/DTX | NACK/DTX | NACK/DTX | $n^{(1)}_{PUCCH,0}$ | 1, 0 |
| NACK/DTX | ACK | NACK/DTX | NACK/DTX | $n^{(1)}_{PUCCH,0}$ | 0, 1 |
| NACK/DTX | NACK | NACK/DTX | NACK/DTX | $n^{(1)}_{PUCCH,0}$ | 0, 0 |
| NACK | NACK/DTX | NACK/DTX | NACK/DTX | $n^{(1)}_{PUCCH,0}$ | 0, 0 |
| DTX | DTX | NACK/DTX | NACK/DTX | No Transmission | | for a PDSCH transmission indicated by the detection of a corresponding PDCCH in subframe n-4 on the primary cell, or for a PDCCH indicating downlink SPS release in subframe n-4 on the primary cell, the PUCCH resource is $n^{(1)}_{PUCCH,j}=n_{CCE}+N^{(1)}_{PUCCH}$, and for transmission mode that supports up to two transport blocks, the PUCCH resource $n^{(1)}_{PUCCH,j+1}$ is given by $n^{(1)}_{PUCCH,j+1}=n_{CCE}+1+N^{(1)}_{PUCCH}$ where $n_{CCE}$ is the number of the first CCE used for transmission of the corresponding PDCCH and $N^{(1)}_{PUCCH}$ is configured by higher layers.

for a PDSCH transmission on the primary cell where there is not a corresponding PDCCH detected in subframe n-4, the value of $n^{(1)}_{PUCCH,j}$ is determined according to higher layer configuration and Table 4. For transmission mode that supports up to two transport blocks, the PUCCH resource $n^{(1)}_{PUCCH,j+1}$ is given by $n^{(1)}_{PUCCH,j+1}=n^{(1)}_{PUCCH,j}+1$.

TABLE 4

| PUCCH resource value for downlink semi-persistent scheduling | |
|---|---|
| Value of 'TPC command for PUCCH' | $n^{(1,p)}_{PUCCH}$ |
| '00' | The first PUCCH resource value configured by the higher layers |

TABLE 4-continued

| PUCCH resource value for downlink semi-persistent scheduling | |
|---|---|
| Value of 'TPC command for PUCCH' | $n^{(1,p)}_{PUCCH}$ |
| '01' | The second PUCCH resource value configured by the higher layers |
| '10' | The third PUCCH resource value configured by the higher layers |
| '11' | The fourth PUCCH resource value configured by the higher layers | for a PDSCH transmission indicated by the detection of a corresponding PDCCH in subframe n-4 on the secondary cell, the value of $n_{PUCCH,j}^{(1)}$, and the value of $n_{PUCCH,j+1}^{(1)}$ for the transmission mode that supports up to two transport blocks is determined according to higher layer configuration and Table 4. The TPC field in the DCI format of the corresponding PDCCH shall be used to determine the PUCCH resource values from one of the four resource values configured by higher layers, with the mapping defined in Table 5. For a UE configured for a transmission mode that supports up to two transport blocks a PUCCH resource value in Table 5 maps to two PUCCH resources $n_{PUCCH,j}^{(1)}$, $n^{(1)}_{PUCCH,j+1}$), otherwise, the PUCCH resource value maps to a single PUCCH resource $n_{PUCCH,j}^{(1)}$.

TABLE 5

| PUCCH resource value for HARQ-ACK resource for PUCCH | |
|---|---|
| Value of 'TPC command for PUCCH' | $n^{(1)}_{PUCCH,j}$ or $(n^{(1)}_{PUCCH,j}, n^{(1)}_{PUCCH,j+1})$ |
| '00' | The 1st PUCCH resource value configured by the higher layers |
| '01' | The 2ndt PUCCH resource value configured by the higher layers |
| '10' | The 3rd PUCCH resource value configured by the higher layers |
| '11' | The 4th PUCCH resource value configured by the higher layers |

Note:
$(n^{(1)}_{PUCCH,j}, n^{(1)}_{PUCCH,j+1})$ are determined from the first and second PUCCH resource list configured by higher layers, respectively.

Table 6 illustrates a mapping table of a transport block for selecting a PUCCH format 1b HARQ-ACK channel and HARQ-ACK(j) of a serving cell.

TABLE 6

| | HARQ-ACK(j) | | | |
|---|---|---|---|---|
| A | HARQ-ACK(0) | HARQ-ACK(1) | HARQ-ACK(2) | HARQ-ACK(3) |
| 2 | TB1 Pcell | TB1 Scell | NA | NA |
| 3 | TB1 serving cell1 | TB2 serving cell1 | TB1 serving cell2 | NA |
| 4 | TB1 Pcell | TB2 Pcell | TB1 Scell | TB2 Scell |

In Table 6, TB1 and TB2 denote transport block 1 and transport 2, respectively.

Figure 9:
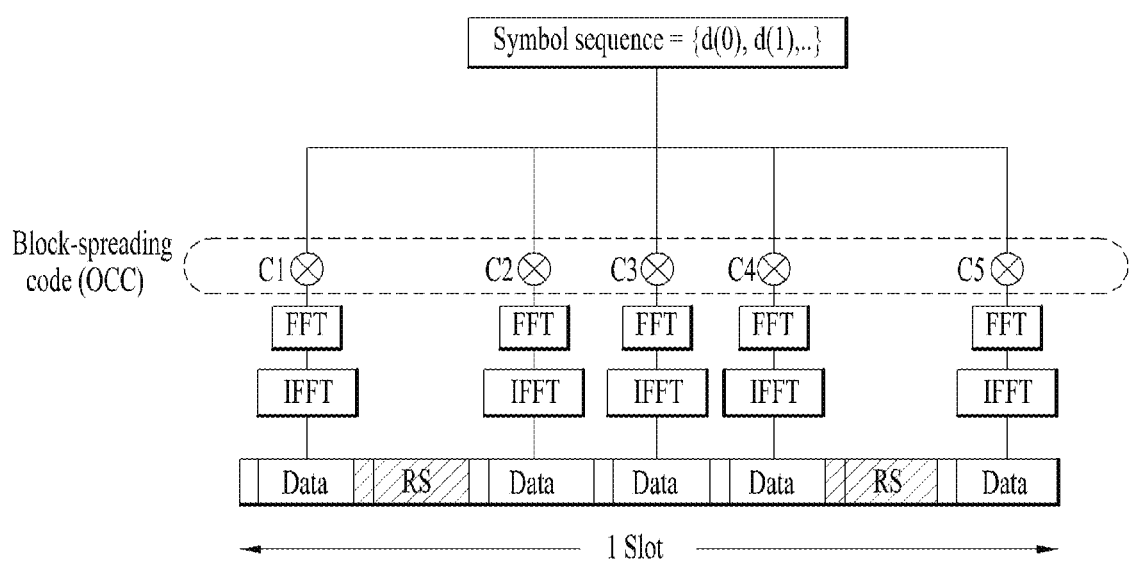
FIG. 9 illustrates a PUCCH format based on block spreading.

FIG. 9 illustrates a PUCCH format based on block spreading.

A block spreading scheme is to transmit a symbol sequence after spreading the symbol sequence in the time domain by an orthogonal cover code (OCC) (also called an orthogonal sequence). According to the block spreading scheme, control signals of multiple UEs may be multiplexed in the same RB by the OCC and then transmitted by an eNB. In PUCCH format 2, one symbol sequence is transmitted in the time domain, wherein UCI of the UEs is multiplexed using a cyclic shift of a CAZAC sequence (i.e. CCS) and then transmitted to the eNB. On the other hand, in a block spreading based new PUCCH format (hereinafter, PUCCH format 3), one symbol sequence is transmitted in the frequency domain, wherein the UCI of the UEs is multiplexed using OCC based time-domain spreading and then transmitted to the eNB. Referring to FIG. 9 as an example, one symbol sequence is spread by a length-5 (i.e. SF=5) OCC and then mapped to 5 SC-FDMA symbols. Although a total of 2 RS symbols is used during one slot in FIG. 9, 3 RS symbols may be used and an OCC of SF=4 may be used for spreading of the symbol sequence and multiplexing of the UEs. Here, the RS symbols may be generated from a CAZAC sequence having a specific cyclic shift and may be transmitted in a form of applying (multiplying) a specific OCC to a plurality of RS symbols in the time domain. In FIG. 9, fast Fourier transform (FFT) may be applied in advance before the OCC and discrete Fourier transform (DFT) may be applied instead of FFT.

For convenience of description, such a channel coding based scheme for transmitting a plurality of ACK/NACK signals using PUCCH format 2 or PUCCH format 3 is referred to as afo "multi-bit ACK/NACK coding" transmission method. This method indicates a method for transmitting an ACK/NACK coded block generated by channel-coding ACK/NACK information or DTX information (indicating that a PDCCH has not been received/detected) for PDSCH(s) of multiple DL CCs, i.e. PDSCH(s) transmitted on multiple DL CCs. For example, if the UE receives two codewords (CWs) by operating in a single user MIMO (SU-MIMO) mode on any DL CC, the UE may transmit one of a total of 4 feedback states of ACK/ACK, ACK/NACK, NACK/ACK, and NACK/NACK per CW on the DL CC or one of a maximum of 5 feedback states including DTX. If the UE receives a single CW, there may be a maximum of 3 states of ACK, NACK, and DTX (if NACK and DTX are identically processed, there may be a total of two states of ACK and NACK/DTX). Accordingly, if a maximum of 5 DL CCs are aggregated for the UE and the UE operates in an SU-MIMO mode on all CCs, there may be a maximum of $5^5$ transmittable feedback states and the size of an ACK/NACK payload for representing these states is a total of 12 bits. If DTX and NACK are identically processed, the number of feedback states is $4^5$ and the size of the ACK/NACK payload for representing these states is a total of 10 bits.

For FDD with PUCCH format 3, the UE shall use PUCCH resource $n^{(3,\tilde{p})}_{PUCCH}$ or $n^{(1,\tilde{p})}_{PUCCH}$ for transmission of HARQ-ACK in subframe n for p~ mapped to antenna port p where for a PDSCH transmission only on the primary cell indicated by the detection of a corresponding PDCCH in subframe n-4, or for a PDCCH indicating downlink SPS release in subframe n-4 on the primary cell, the UE shall use PUCCH format 1a/1b and PUCCH resource $n^{(1,\tilde{p})}_{PUCCH}$ with $n^{(1,\tilde{p}0)}_{PUCCH}=n_{CCE}+N^{(1)}_{PUCCH}$ for antenna port $p_0$, where $n_{CCE}$ is the number of the first CCE (i.e. lowest CCE index used to construct the PDCCH) used for transmission of the corresponding PDCCH and $N^{(1)}_{PUCCH}$ is configured by higher layers. When two antenna port transmission is configured for PUCCH format 1a/1b, the PUCCH resource for antenna port $p_i$ is given by $n^{(1,\tilde{p}1)}_{PUCCH}=n_{CCE}+1+N^{(1)}_{PUCCH}$.

for a PDSCH transmission only on the primary cell where there is not a corresponding PDCCH detected in subframe n-4, the UE shall use PUCCH format 1a/1b and PUCCH resource $n^{(1,\tilde{p})}_{PUCCH}$ where the value of $n^{(1,\tilde{p})}_{PUCCH}$ is determined according to higher layer configuration and Table 4. For a UE configured for two antenna port transmission for PUCCH format 1a/1b, a PUCCH resource value in Table 4 maps to two PUCCH resources with the first PUCCH resource $n^{(1,\tilde{p}0)}_{PUCCH}$ antenna port $p_0$ and the second PUCCH resource $n^{(1,\tilde{p}1)}_{PUCCH}$ for antenna port $p_1$, otherwise, the PUCCH resource value maps to a single PUCCH resource $n^{(1,\tilde{p}0)}_{PUCCH}$ for antenna port $p_0$.

for a PDSCH transmission on the secondary cell indicated by the detection of a corresponding PDCCH in subframe n-4, the UE shall use PUCCH format 3 and PUCCH resource $n^{(3,\tilde{p})}_{PUCCH}$ where the value of $n^{(3,\tilde{p})}_{PUCCH}$ is determined according to higher layer configuration and Table 7. The TPC field in the DCI format of the corresponding PDCCH shall be used to determine the PUCCH resource values from one of the four resource values configured by higher layers, with the mapping defined in Table 7. For a UE configured for two antenna port transmission for PUCCH format 3, a PUCCH resource value in Table 7 maps to two PUCCH resources with the first PUCCH resource $n^{(3,\tilde{p}0)}_{PUCCH}$ for antenna port $p_0$ and the second PUCCH resource $n^{(3,\tilde{p}1)}_{PUCCH}$ for antenna port $p_1$, otherwise, the PUCCH resource value maps to a single PUCCH resource $n^{(3,\tilde{p}0)}_{PUCCH}$ for antenna port $p_0$. A UE shall assume that the same HARQ-ACK PUCCH resource value is transmitted in each DCI format of the corresponding secondary cell PDCCH assignments in a given subframe.

TABLE 7

| PUCCH resource value for HARQ-ACK resource for PUCCH | |
|---|---|
| Value of 'TPC command for PUCCH' | $n^{(3,\tilde{p})}_{PUCCH}$ |
| '00' | The 1st PUCCH resource value configured by the higher layers |
| '01' | The 2nd PUCCH resource value configured by the higher layers |
| '10' | The 3rd PUCCH resource value configured by the higher layers |

TABLE 7-continued

PUCCH resource value for HARQ-ACK resource for PUCCH

| Value of 'TPC command for PUCCH' | $n^{(3,p-)}{}_{PUCCH}$ |
|---|---|
| '11' | The 4th PUCCH resource value configured by the higher layers |

HARQ-ACK for a PDCCH or a PDSCH received in one subframe on a single carrier may be represented as one bit. Upon detecting the PDCCH and upon successfully decoding the corresponding PDSCH, the UE feeds back a bit (e.g. 1 b) indicating ACK and, upon failing to detect the PDCCH or failing to decode the PDSCH, the UE feeds back a bit (e.g. 0 b) indicating NACK. HARQ-ACK for PDCCHs/PDSCHs on a plurality of carriers or HARQ-ACK for PDCCHs/PDSCHs in a plurality of subframes may be represented as two bits. For example, when the UE feeds back HARQ-ACK for PDCCHs/PDSCHs on two carriers or in two subframes, if the UE detects a PDCCH on one of the two carriers or in one of the two subframes and decodes the PDSCH according to the PDCCH, a corresponding ACK/NACK bit may be configured according to a result of decoding the PDSCH. If the UE does not detect a PDCCH on the other carrier of the two carriers or in the other subframe of the two subframes, HARQ-ACK corresponds to DTX. However, since the UE should feed back 2-bit HARQ-ACK to the eNB, the UE sets the other bit of 2-bit HARQ-ACK as NACK and then feeds back 2-bit HARQ-ACK to the eNB.

As more communication devices demand larger communication capacity, efficient use of a limited frequency band in a future wireless communication system becomes increasingly important. Even in a cellular communication system such as a 3GPP LTE/LTE-A system, a method of using, for traffic offloading, an unlicensed band such as a band of 2.4 GHz used by a legacy Wi-Fi system or an unlicensed band such as a band of 5 GHz, which is newly in the spotlight, is under consideration.

Basically, since the unlicensed band is based on wireless transmission/reception through contention between communication nodes, it is necessary for each communication node to confirm that other communication nodes do not perform signal transmission by performing channel sensing before signal transmission. This procedure is called clear channel assessment (CCA). Even an eNB or a UE of the LTE system needs to perform CCA for signal transmission in the unlicensed band (hereinafter, referred to as an LTE-U band). While the eNB or the UE of the LTE system transmits a signal, other communication nodes such as a Wi-Fi node should not create interference by performing CCA. For example, in Wi-Fi standards (e.g. 801.11ac), a CCA threshold is specified as −62 dBm with respect to a non-Wi-Fi signal and as −82 dBm with respect to a Wi-Fi signal, which means that an STA or an AP does not perform signal transmission so as not to create interference when a signal other than the Wi-Fi signal is received at a power of −62 dBm or more. Characteristically, in a Wi-Fi system, the STA or the AP may perform CCA and perform signal transmission, unless signals greater than the CCA threshold are detected for 4 μs or more.

Prior to description of embodiments of the present invention, an IEEE 802.11 system will be described in detail as an example of a CSMA based system to which the embodiments of the present invention are applicable. Although the IEEE 802.11 system is described as an example of the CSMA based system for convenience, the embodiments of the present invention may be applied to other CSMA based systems.

Figure 10:
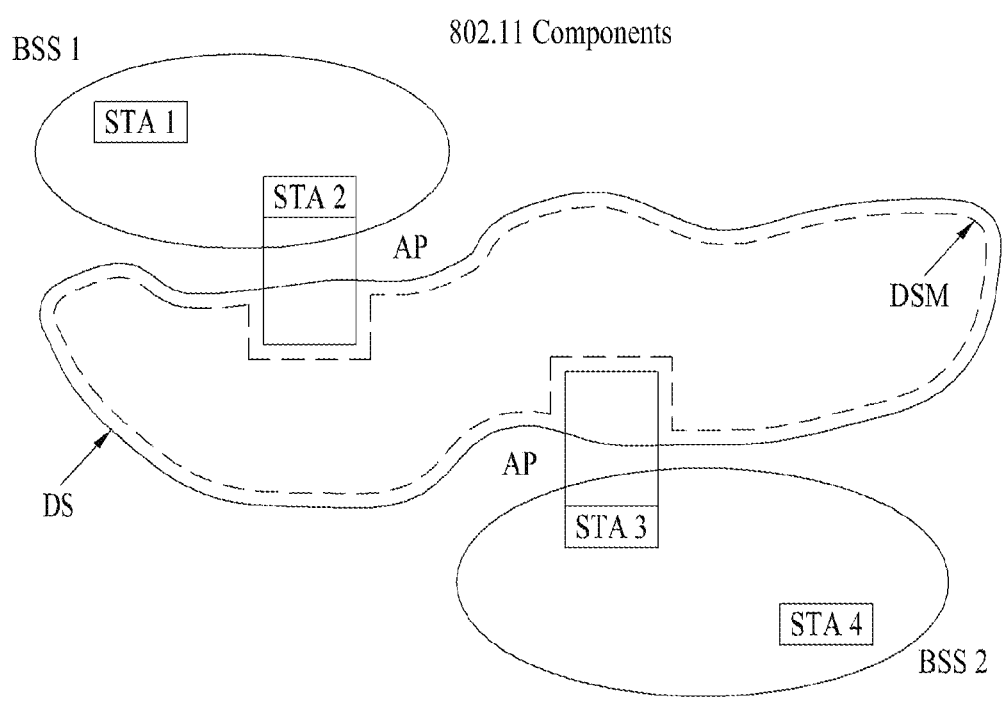
FIG. 10 is a diagram illustrating an IEEE 802.11 system to which the present invention is applicable.

FIG. 10 is a diagram illustrating an exemplary structure of an IEEE 802.11 system to which the present invention is applicable.

The structure of the IEEE 802.11 system may be configured by a plurality of components and may provide a WLAN that supports station (STA) mobility transparent for higher layers according to interaction of the components. In a WLAN system, an STA is a device operating according to MAC/PHY specifications of IEEE 802.11. The STA includes an AP STA and a non-AP STA. The non-AP STA corresponds to a device that a user generally handles in person, such as a laptop computer or a mobile phone.

The non-AP STA may be referred to as a terminal, a wireless transmit/receive unit (WTRU), a user equipment (UE), a mobile station (MS), a mobile terminal (MT), a mobile subscriber station (MSS), etc. The AP may correspond to a base station (BS), a Node-B, an evolved Node-B (eNB), a base transceiver system (BTS), a femto BS, a pico BS, etc. in other wireless communication fields.

Referring to FIG. 10, a basic service set (BSS) may correspond to a basic component block in an IEEE 802.11 LAN. An ellipse that defines a BSS in FIG. 10 may indicate a coverage area in which STAs belonging to the corresponding BSS maintain communication. This area may be referred to as a basic service area (BSA). If an STA moves out of the BSA, the STA cannot directly communicate with other STAs in the BSA.

The most basic type of BSS in the IEEE 802.11 LAN is an independent BSS (IBSS). For example, the IBSS may have a minimum configuration including only two STAs. This configuration is possible when STAs can directly communicate with each other. This type of LAN may be configured as necessary rather than being pre-designed and configured and may be called an ad-hoc network.

When an STA is turned on or off, or enters or leaves the coverage of a BSS, membership of STAs in the BSS may be dynamically changed. To become a member of the BSS, an STA may join the BSS using a synchronization procedure. To access all services based on the BSS, an STA needs to be associated with the BSS. Such association may be dynamically configured and may use a distribution system service (DSS).

In a LAN, a direct STA-to-STA distance may be limited by physical (hereinafter, PHY) layer performance. While this distance limit may be sufficient in some cases, communication between STAs having a longer distance therebetween may be needed in other cases. To support an extended coverage, a distribution system (DS) may be configured.

The DS refers to a structure in which BSSs are connected to each other. Specifically, BSSs may be present as components of an extended form of a network composed of a plurality of BSSs rather than being independently present.

The DS is a logical concept and may be specified by characteristics of a distribution system medium (DSM). In IEEE 802.11 standards, a wireless medium (WM) and the DSM are logically discriminated. These logical media are used by different components for different purposes. In definition of IEEE 802.11 standards, the media are not limited as the same medium or different media. The fact that plural media are logically different from each other may explain flexibility of an IEEE 802.11 LAN structure (a DS structure or other network structures). That is, the IEEE 802.11 LAN structure may be implemented in various manners and may be independently specified by physical characteristics of implementations thereof.

The DS may support mobile devices by providing seamless integration of a plurality of BSSs and providing logical services necessary to handle addresses to a destination.

The AP (i.e. an AP STA) refers to an entity that enables associated STAs to access the DS through the WM and has STA functionality. Data may be transmitted between a BSS and the DS through the AP. For example, STA2 and STA3 shown in FIG. 10 have STA functionality and provide a function of enabling associated STAs (STA1 and STA4) to access the DS. In addition, all APs are addressable entities because they basically correspond to STAs. An address used by an AP for communication on the WM does not necessarily need to be equal to an address used by the AP for communication on the DSM.

Data transmitted from one of STAs associated with an AP to an STA address of the AP may be received at an uncontrolled port at all times and processed by an IEEE 802.1X port access entity. In addition, the transmitted data (or frame) may be delivered to the DS when a controlled port is authenticated.

In a WLAN system based on IEEE 802.11, a basic access mechanism of MAC is a CSMA/CA mechanism. The CSMA/CA mechanism is also called a distributed coordination function (DCF) of IEEE 802.11 MAC and basically adopts an access mechanism of "listen before talk". According to this type of access mechanism, an AP and/or an STA may perform CCA for sensing a radio channel or a medium for a predetermined time duration (e.g. DCF inter-frame space (DIFS) prior to starting transmission. If it is determined that the medium is in an idle state as a sensing result, the AP and/or the STA starts to transmit a frame through the medium. Meanwhile, if it is sensed that the medium is in an occupied state, the AP and/or the STA may attempt to transmit the frame after waiting a delay duration for medium access (e.g. a random backoff period) without starting transmission thereof. Since it is expected that multiple STAs attempt to perform frame transmission after waiting different times by applying the random backoff period, collision can be minimized.

Figure 11:
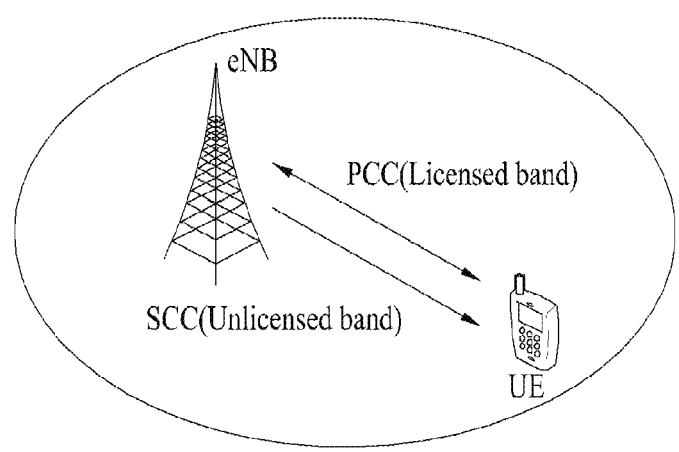
FIG. 11 illustrates a carrier aggregation situation of a 3GPP LTE-A band, which is a licensed band, and an unlicensed band (hereinafter, LTE-U band).

FIG. 11 illustrates a carrier aggregation situation of a 3GPP LTE-A band, which is a licensed band, and an unlicensed band (hereinafter, an LTE-U band).

Referring to FIG. 11, an eNB may transmit a signal to a UE or the UE may transmit a signal to the eNB in the carrier aggregation situation of the LTE-A band and the LTE-U band. In the following description, it is assumed for convenience of description of proposed schemes that the UE is configured to perform wireless communication through two component carriers (CCs) in the LTE-A band and the LTE-U band. As an example, a CC of the LTE-A band may be configured as a PCC and a CC of the LTE-U band may be configured as an SCC. However, the embodiments of the present invention may be extensively applied to a situation in which a plurality of LTE-A bands and a plurality of LTE-U bands are used by a carrier aggregation scheme or may be applied even when signal transmission/reception between the eNB and the UE is performed only in the LTE-U band. In addition, the embodiments of the present invention may be extensively applied not only to the 3GPP LTE/LTE-A system but also to systems having other characteristics.

Hereinafter, for convenience of description, a cell that is configured in a licensed band for 3GPP LTE/LTE-A and operates by a 3GPP LTE/LTE-A scheme will be referred to as an Lcell and a cell that is configured in an unlicensed band operating by an LTE-U scheme and operates by the LTE-U scheme will be referred to as a Ucell.

In order for an eNB and a UE to perform communication in the LTE-U band which is an unlicensed spectrum, the eNB and the UE should occupy/secure the corresponding band for a specific time duration through contention with other communication (e.g. Wi-Fi) systems which are not associated with the LTE/LTE-A system. Hereinafter, the time duration occupied/secured for communication in the LTE-U band will be referred to as a reserved resource period (RRP), for convenience. To secure the RRP, various methods may be used. Typically, there may be a method of transmitting a specific reservation signal so that other communication system devices such as a Wi-Fi device may recognize that a corresponding radio channel is busy or continuously transmitting an RS and/or a data signal so that a signal of a specific power level or more may be seamlessly transmitted during the RRP.

The RRP may be configured by carrier sensing performed by the eNB. If the eNB has determined an RRP during which the eNB desires to occupy the LTE-U band, the eNB may pre-inform the UE of the determined RRP to cause the UE to maintain a communication transmission/reception link during the indicated RRP. As a scheme in which the eNB informs the UE of related RRP information, the eNB may transmit the RRP information to the UE through another CC (e.g. LTE-A band) which is associated in a CA form.

An entity for determining the RRP may differ according to whether transmission is DL transmission or UL transmission. For example, an RRP for DL transmission (hereinafter, DL RPP) may be determined by the eNB based on carrier sensing by the eNB. An RRP for UL transmission (UL RRP) may be determined by the eNB based on carrier sensing by the eNB and may be indicated to the UE. Alternatively, the UE may confirm or determine the UL RRP in units of subframes by checking a channel state prior to signal transmission, i.e. through carrier sensing thereby.

On a cell used for legacy CA, i.e. on an Lcell, an RS for channel synchronization or an RS for channel measurement, such as a PSS/SSS/PBCH, a CRS, and/or a CSI-RS, appears periodically and continuously. In contrast, on a Ucell, the eNB may configure the RRP only when the Ucell is in an idle state and transmit the RS for channel measurement in the RRP. Therefore, the synchronization/measurement RSs will appear aperiodically and/or discontinuously on the Ucell.

Meanwhile, on the Lcell, although the UE is configured to detect the RS(s) or perform synchronization or measurement using the RS(s) for a time duration while the Lcell is activated, the RS(s) may be transmitted for a time duration while the Lcell is inactivated. The synchronization/measurement RS(s) are continuously transmitted regardless of activation or inactivation of the Lcell but the UE is configured to detect the synchronization/measurement RSs only for a time duration during which the Lcell is activated. Unlike this, on the Ucell, the eNB transmits the synchronization or measurement RS(s) only during the RRP and, in principle, does not transmit synchronization or measurement RS(s) during a non-RRP because a wireless communication medium is occupied by other devices during the non-RRP.

As another example of an operation in the LTE-U band which operates by a contention-based random access scheme, the eNB may first perform carrier sensing (CS) before transmitting/receiving data. The eNB may check whether a current channel state of an SCell is busy or idle. If it is determined that the current channel state is idle, the eNB may transmit a scheduling grant through a PDCCH of a PCell (i.e. through cross carrier scheduling (CCS)) or through a PDCCH of the SCell and attempt to transmit/receive data. In this case, for example, the eNB may configure an RRP including M consecutive subframes (SFs). Here, the eNB may pre-inform the UE of the M value and usage of the M SFs through higher layer signaling (using the PCell) or through a physical control/data channel. A start timing of the RRP may be periodically or semi-statically configured through higher layer signaling. If the start timing of the RRP should be set to SF #n, the start timing of the RRP may be designated through physical layer signaling in SF #n or SF #(n-k).

FIG. 12 illustrates a subframe configuration of an RRP.

The RRP may be configured such that boundaries of subframe(s) constituting the RRP are aligned with boundaries of subframe(s) configured on a Pcell, as illustrated in FIG. 12(a), or such that the boundaries of the subframe(s) constituting the RRP are misaligned with the boundaries of the subframe(s) configured on the Pcell, as illustrated in FIG. 12(b).

As described above, in an LTE-U system that operates on a contention basis through carrier sensing in an unlicensed band, an available (e.g. usable for data transmission/scheduling) resource duration may be aperiodically secured/configured according to a carrier sensing result. When a cell/carrier operating according to the above LTE-U scheme is referred to as a Ucell, for convenience, and a resource duration aperiodically configured on the Ucell is defined as an RRP, if the RRP is secured on the Ucell, a situation may be considered in which an eNB opportunistically schedules data transmission to a UE for which the Ucell is configured only during the RRP.

Even when the RRP is secured/configured through a procedure such as carrier sensing, strong interference may be abruptly received (by the LTE-U system operating on the Ucell) from other systems, such as a Wi-Fi system, that attempt to perform a signal transmission operation on the unlicensed band due to sensing inaccuracy caused by a hidden node problem (HNP). This interference situation (presence/absence of interference) may vary with the RRP. For example, when initial transmission of data corresponding to a specific HARQ process number is performed in a k-th RRP duration on the Ucell, strong interference may be received and a result of decoding the received data may be NACK. However, when retransmission of the same data is performed in a (k+1)-th RRP duration, received quality (e.g. SINR) may be relatively better.

In such a situation,

Case #1: If a UE simply feeds back NACK as a HARQ-ACK response to reception of initially transmitted data (including strong interference) in the k-th RRP, the eNB may select a specific redundancy version (RV) (e.g. RV #2) which is different from an RV (e.g. RV #0) during initial transmission aimed at incremental redundancy (IR) and perform retransmission in the (k+1)-th RRP based on the selected RV. In this case, since an initially transmitted systematic part (bit) (e.g. corresponding to a zero RV) has already been received at a very low SINR, a retransmitted (e.g. corresponding to a non-zero RV) parity part (bit) may not be helpful and thus error recovery through corresponding retransmission may not be easy. Rather, it may be more favorable in terms of performance that the eNB performs retransmission without changing an RV (i.e. with the same RV as that used in initial transmission) and the UE chase-combines retransmission with an initially received signal.

Case #2: From another viewpoint, when strong interference occurs during data reception in a specific RRP, a noise level or noise level variance significantly increases and accuracy of an estimation value for an SINR is also lowered, thereby deteriorating reliability. Under this state, even when SINR based weighted combining is performed on a received signal, performance deterioration may occur or latency/overhead consumed for a HARQ (retransmission) process for overcoming an influence of strong interference may increase.

Case #3: If a reception (soft bit) buffer of the UE having a limited size is used and a plurality of HARQ processes is performed based on the reception buffer in a situation in which strong irregular interference occurs, it may be more efficient in terms of delay/overhead generated by a HARQ (retransmission) process to perform selective combining on a signal part (e.g. RV) having better received quality (e.g. SINR) in the same HARQ process or perform selective combining on a signal having greater gain upon performing reception buffering for different HARQ processes.

In consideration of the above problems, the present invention proposes embodiments of HARQ-ACK feedback and a UE operation considering data transmission/scheduling in a situation in which strong interference is aperiodically received as in an RRP duration configured on a Ucell in an LTE-U situation. The embodiments proposed by the present invention may be broadly configured to 1) determine a HARQ-ACK state for data reception and a UE operation associated with the HARQ-ACK state according to a specific condition related to a received signal while a legacy HARQ-ACK state maintains ACK/NACK/DTX, or 2) define a new HARQ-ACK state and a UE operation associated with the HARQ-ACK state (according to a specific condition) in addition to the legacy HARQ-ACK state.

The embodiments of the present invention may mean a UE operation in a subframe in which DL grant DCI for scheduling a PDSCH is received/detected and/or in a subframe in which a PDSCH scheduled based on DCI transmission (or SPS scheme) is received (or UE operation corresponding to the subframe(s)). Hereinafter, it is basically assumed that a decoding result by the UE for received data (or a received signal) is NACK.

Upon receiving data, if an interference (or noise) level measured from a received signal exceeds a specific threshold value, one of the following embodiments according to the present invention may be performed for a UE operation for the received signal and for determination of a HARQ-ACK feedback state corresponding to data reception. Herein, the interference (or noise) level and the threshold value thereof may be calculated/set as received signal quality (e.g. SINR), decoding metric (e.g. log-likelihood ratio (LLR)), or an (interference) power level [dBm]. In the embodiments of the present invention, combining may include both reception combining for a retransmitted signal or retransmitted signal part (e.g. RV) and reception buffering for an initially transmitted signal.

(1) Reuse of legacy HARQ-ACK state

Figure 13:
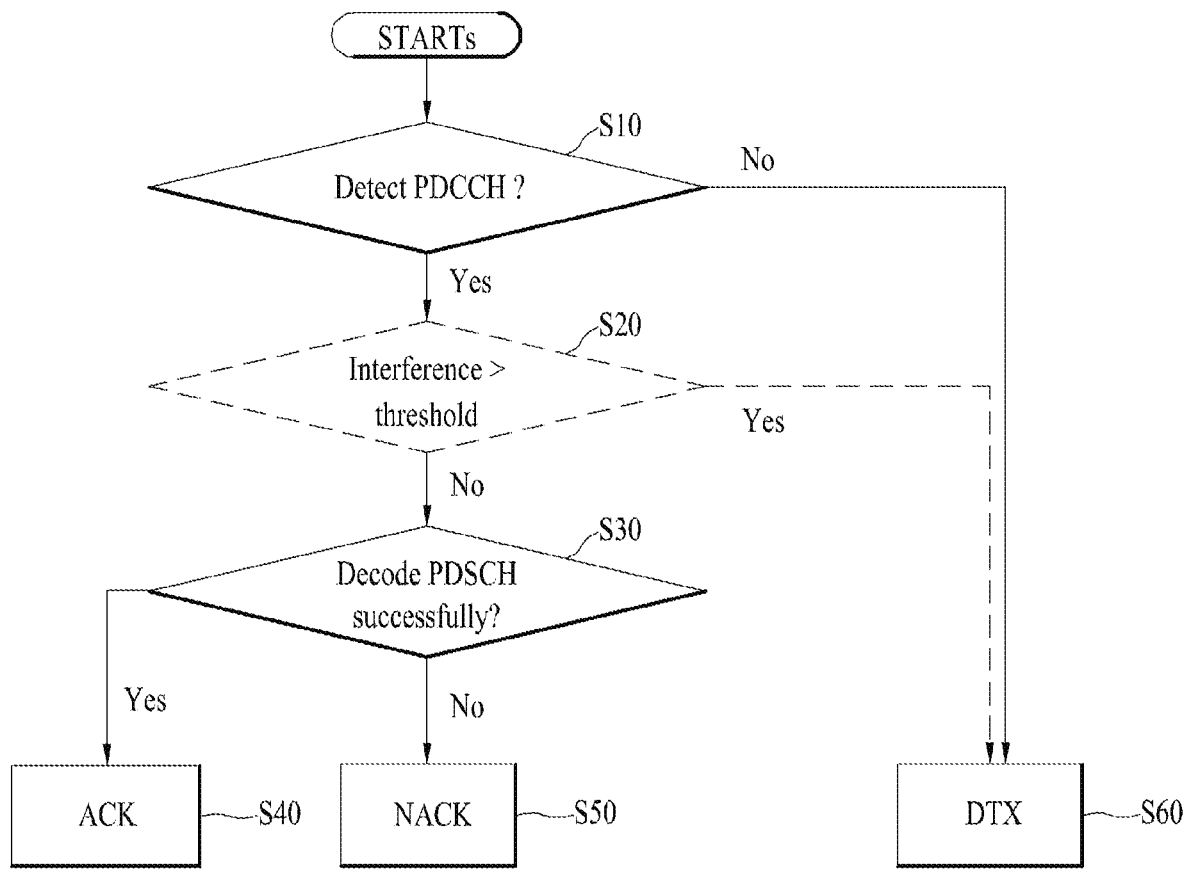
FIG. 13 illustrates a HARQ-ACK feedback method according to an embodiment of the present invention.

FIG. 13 illustrates a HARQ-ACK feedback method according to an embodiment of the present invention.

Referring to FIG. 13, a UE attempts to receive a PDCCH thereof by monitoring the PDCCH in a (DL) subframe (S10). Upon not detecting the PDCCH for a serving cell configured for the UE (S10, No), since the UE cannot obtain DL grant DCI or UL grant DCI carried by the PDCCH, the UE performs no operation associated with the PDCCH (S60). Upon detecting the PDCCH carrying the DL grant DCI (S10, Yes), the UE attempts to decode a PDSCH according to the DL grant DCI (S30). In other words, the UE receives DL data over the PDSCH according to the DL grant DCI and decodes the DL data (S30). Upon successfully decoding the DL data (S30, Yes), the UE transmits ACK as HARQ-ACK for the serving cell or for the PDCCH/PDSCH (S40). Meanwhile, upon not successfully decoding the DL data (S30, No), i.e., upon failing to decode the DL data, the UE transmits NACK as HARQ-ACK for the serving cell or for the PDCCH/PDSCH (S40).

According to an embodiment of the present invention, an interference level is considered in addition to whether the PDCCH is detected and/or whether the PDSCH is successfully decoded. In Embodiment (1) of the present invention, if an interference or noise level measured by the UE exceeds a specific threshold value, the UE operates as if the UE has never detected the PDCCH although the PDCCH is detected. That is, according to a legacy HARQ-ACK feedback process, the UE should transmit ACK or NACK upon detecting the PDCCH. In contrast, according to Embodiment (1) of the present invention, the UE operates as if the UE has not detected the PDCCH so as to cause the eNB to maintain an RV.

For example, referring to FIG. 13, the UE may detect the PDCCH for a Ucell on the Ucell or on another cell carrier-aggregated with the Ucell (S10, Yes). The UE receives the DL data through the PDSCH on the Ucell according to the DL grant DCI carried by the PDCCH. However, if a measured interference or noise level upon receiving the data through the PDSCH exceeds the threshold value (S20, Yes), the UE may inform the eNB of DTX by not transmitting HARQ-ACK for the Ucell, regardless of a decoding result of the PDSCH or without attempting to perform decoding, combining, or buffering for the PDSCH (S60). For example, the UE may not transmit a PUCCH carrying HARQ-ACK on a PUCCH resource, thereby preventing the eNB from retransmitting data having an RV different from an RV of data carried by the PDSCH. If the interference or noise level upon receiving data through the PDSCH does not exceed the threshold value, the UE may transmit ACK or NACK according to a result of decoding the PDSCH on a PUCCH resource determined based on a specific CCE (first CCE) of the PDCCH or on a PUCCH resource indicated by an ARI in the PDCCH. According to Embodiment (1) of the present invention, one of the following operations may be performed.

(a) Combining but DTX feedback

The UE performs combining for a received signal (in a data reception buffer) but processes a HARQ-ACK state for data reception as DTX (rather than NACK). This operation may be useful in a situation of Case #1 described above.

Characteristically, this operation may be limitedly applied only when signal transmission corresponds to initial transmission (for data corresponding to a specific HARQ process number), signal part transmission, all or a part (e.g. a specific portion [%] or more) of which include systematic bits, or signal part transmission corresponding to an RV initial value (e.g. 0).

(b) No combining and DTX feedback

The UE may perform the same process/operation as the case in which the UE fails to detect the DL grant DCI, i.e. the UE does not perform combining for a received signal, and simultaneously processes the HARQ-ACK state for data reception as DTX (rather than NACK). This operation may be useful in Case #2 and/or Case #3 described above.

Characteristically, this operation may be limitedly applied only when signal transmission corresponds to transmission of a specific signal part (or RV value) or a specific RRP duration length and/or a specific interval between RRP durations.

(c) No combining but NACK feedback

The UE does not perform combining for a received signal but processes the HARQ-ACK state for data reception as NACK. This operation is useful in Case #2 and/or Case 3 described above when the UE causes the eNB to improve reception performance of the PDSCH (rather than DCI) (e.g. by adjusting the number of RBs and/or an MCS level).

Characteristically, this operation may be limitedly applied only when signal transmission corresponds to transmission of a specific signal part (or RV value) or a specific RRP duration length and/or a specific interval between RRP durations.

In (a) and (b) of Embodiment (1) of the present invention, the HARQ-ACK state is processed as DTX. That is, in (a) and (b) of Embodiment (1) described above, although the UE has successfully detected the DL grant DCI, the HARQ-ACK state is processed as the same case as when the UE has failed to detect the DL grant DCI (and the PDSCH corresponding to the DL grant DCI). Nevertheless, upon controlling UL power for the PUCCH carrying HARQ-ACK feedback, it may be favorable in terms of HARQ-ACK PUCCH transmission performance/coverage to calculate related parameters (e.g. $n_{HARQ}$ (refer to Section 5.1.2.1 and Section 10.1 of 3GPP TS 36.213)) on the premise that the PDSCH is still received.

Embodiment (1) of the present invention may be limited to scheduling only the Ucell so that DTX for the Ucell may be distinguished from a NACK/DTX state which is transmitted as being set to NACK during legacy (Scell) DTX. For example, ACK/NACK information for the Ucell is not transmitted together with ACK/NACK information for another cell as one payload, and Embodiment (1) of the present invention is limitedly applied to transmission of ACK/NACK information for the PDCCH/PDSCH only on the Ucell.

(2) New HARQ-ACK state

In Embodiment (2) of the present invention, if the interference (or noise) level measured from a received signal upon receiving data exceeds a specific threshold value or if a separate interference level condition (e.g. threshold value) is not given, the following new states may be defined for the operation of the UE for the received signal and HARQ-ACK feedback corresponding to data reception. Even in the following states, a result of decoding the received data (or received signal) is basically NACK.

(a) Combining but no RV change

A state in which the UE performs combining for the received signal but requests that the eNB not change an RV value may be defined as a new HARQ-ACK state. This state may be useful in a situation of Case #1 described above.

(b) No combining and No RV change

A state in which the UE does not perform combining for the received signal and simultaneously requests that the eNB not change the RV value may be defined as the new HARQ-ACK state. This state may be useful in a situation of Case #2/3.

(c) No combining but RV change

A state in which the UE does not perform combining for the received signal but requests that the eNB change the RV value may be defined as the new HARQ-ACK state. Alternatively, a state in which the UE does not perform combining for the received signal and makes no additional request for maintaining/changing the RV value so that the eNB determines whether the RV value is changed may be defined as the new HARQ-ACK state. This state may be useful a situation of Case #2/3 described above.

Additionally, a state such as "Combining but Interference" in which the UE performs combining for the received signal but informs the eNB that strong interference has been measured from the received signal may be defined as the new HARQ-ACK state. Alternatively, a state such as "No combining and Interference" in which the UE informs the eNB that the UE has not performed combining for the received signal because strong interference has been measured from the received signal may be defined as the new HARQ-ACK state. Alternatively, the UE may inform the eNB of a state such as "Combining but Interference" or "No combining and Interference" through independent signaling different from HARQ-ACK feedback.

As another method, when a transport block for one data transmission is segmented into a plurality of code blocks, an individual HARQ-ACK feedback state based on a legacy scheme or the proposed scheme may be configured/transmitted on a code block basis or on a code block group basis, for effective retransmission and error recovery. Alternatively, a method of performing selective combining only for a specific partial code block or a code block group based on the proposed or other schemes may be considered.

As another method for solving symbol-level interference or code block interference, there is a method of grouping multiple code blocks belonging to one codeword into a plurality of code block groups and generating ACK/NACK for the PDSCH with respect to each code block group, instead of a legacy method of generating 1-bit ACK/NACK for the PDSCH with respect to all code blocks belonging to one codeword. Herein, the meaning of "generating ACK/NACK with respect to each code block group" means generating ACK when the UE has successfully decoded all code blocks belonging to the code block group and generating NACK when the UE has failed to decode at least one code block.

According to a legacy LTE PDSCH, when a rank of the PDSCH through multi-layer transmission using multiple transmission/reception antennas is equal to or greater than 2, one PDSCH includes two codewords and separate HARQ-ACK is generated with respect to each codeword. This scheme may be extended such that, in the case in which a rank of the PDSCH transmitted in an unlicensed band is 1, even if one codeword is generated, when the one codeword includes a predetermined number of code blocks or more, two code block groups are generated and two HARQ-ACKs, each HARQ-ACK corresponding to each code block group, may be generated according to a legacy PDSCH generation scheme. A process for the UE to feed back the HARQ-ACKs to the eNB is the same as a process for the UE to receive the PDSCH having a rank of 2 or more and feed back the two HARQ-ACKs. If the PDSCH maintains frequency first mapping, since a neighbor code block has a high probability of experiencing similar interference, it is desirable to group code blocks which are adjacent in a mapping order into one code block group. This operation may be limitedly applied only when the PDSCH transmitted in the unlicensed band is segmented into a predetermined number of code blocks or more. Then, only single HARQ-ACK may be transmitted when there are few code blocks, thereby raising reliability of HARQ-ACK feedback. Alternatively, the eNB may pre-indicate into how many code block groups one PDSCH is segmented through a higher layer signal.

Alternatively, a scheme in which the UE receives a plurality of PDSCHs through carrier aggregation and simultaneously reports a plurality of HARQ-ACKs for the PDSCHs to the eNB may be applied. Assuming that rank-1 transmission is performed, if N DL carriers are configured for the UE and N PDSCHs are simultaneously transmitted in one subframe, when DL subframes and UL subframes for HARQ-ACK are in one-to-one correspondence, the UE should transmit a maximum of N HARQ-ACKs in one UL subframe. In a legacy LTE system, such an operation is performed using ACK/NACK bundling, HARQ-ACK channel selection, or PUCCH format 3 for transmitting a plurality of HARQ-ACK bits through channel coding. If this principle is applied, when one PDSCH in DL carrier i is divided into Gi code block groups, the UE transmits G (=G1+G2+ . . . +GN) HARQ-ACKs in one subframe. For example, when PUCCH format 3 is used, the G HARQ-ACK bits pass through one channel coding and then are transmitted to the eNB through a given resource.

In the above-described embodiments of the present invention, the total power of a received signal may be determined as an interference or noise level, without distinguishing between a signal term and an interference term from the received signal. Alternatively, the remaining power obtained by subtracting (e.g. canceling) the signal term from the sum of a signal and interference may be calculated as the interference or noise level in the embodiments of the present invention. Alternatively, an additional interference measurement resource (e.g. resource element(s) having zero-power) may be configured and a power measured from the interference measurement resource may be calculated as the interference or noise level. However, a method of measuring the interference or noise level for a data reception signal may be implemented by the UE and the embodiments of the present invention are based on the premise that the UE is capable of identifying the interference or noise level regardless of a detailed method of measuring the interference or noise level. Accordingly, the embodiments of the present invention may be applied irrespective of how the UE measures the interference or noise level.

Figure 14:
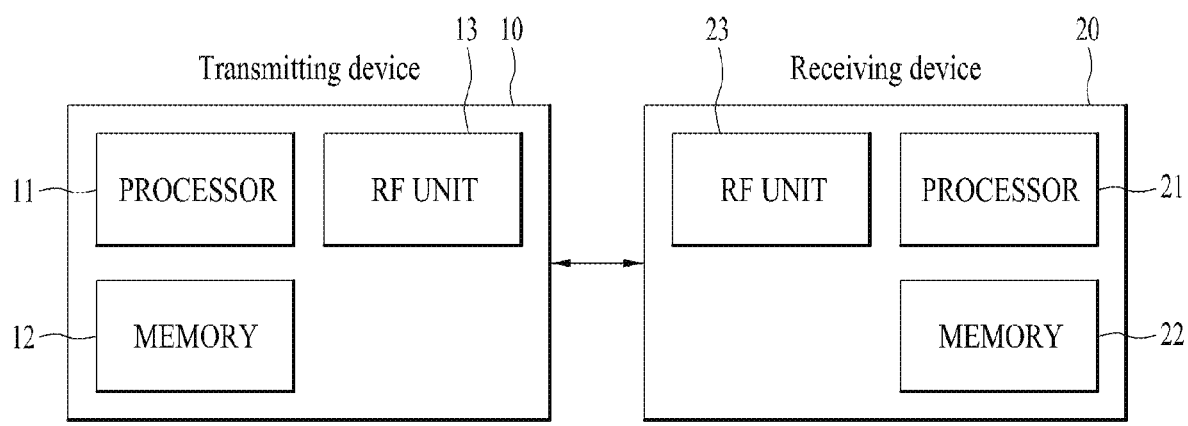
FIG. 14 is a block diagram illustrating elements of a transmitting device 10 and a receiving device 20 for implementing the present invention.

FIG. 14 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The UE processor according to an embodiment of the present invention considers an interference level or a noise level in performing HARQ-ACK feedback.

For example, according to Embodiment (1) of the present invention, when an interference/noise level exceeds a threshold value, the UE processor of the present invention may process a response to a PDSCH as DTX regardless of whether the PDSCH corresponding to a PDCCH has successfully been decoded even though the PDCCH has been detected. The UE processor may control the UE RF unit not to perform HARQ-ACK transmission on a PUCCH resource which corresponds to the PDCCH or is indicated by the PDCCH even though the PDCCH has been detected. For example, the UE processor may control the UE RF unit not to perform HARQ-ACK transmission by dropping PUCCH transmission on the PUCCH resource.

Alternatively, the UE processor of the present invention may generate a new HARQ-ACK state indicating that the interference/noise level exceeds the threshold value according to Embodiment (2) of the present invention. If the interference/noise level exceeds the threshold value, the UE processor may control the RF unit to transmit the new HARQ-ACK state as HARQ-ACK for a corresponding serving cell or for the PDCCH/PDSCH.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a BS, a UE, or other devices in a wireless communication system.

What is claimed is:

1. A method for performing hybrid automatic repeat request (HARQ)-acknowledgement (ACK) feedback, the method performed by a user equipment (UE) and comprising:
    detecting a physical downlink (DL) control channel (PDCCH) carrying DL control information (DCI) for a cell configured in an unlicensed band;
    receiving DL data including a plurality of codewords through a physical downlink shared channel (PDSCH) according to the DCI;
    receiving indication information indicating that the plurality of codewords are divided into one or more code block groups;
    measuring an interference level using the received DL data;
    configuring a HARQ-ACK state if the measured interference level exceeds a specific threshold; and
    transmitting, to a base station (BS), a HARQ-ACK feedback for the DL data based on the HARQ-ACK state, wherein the HARQ-ACK feedback is generated for each of the one or more code block groups based on the received indication information, and wherein the HARQ-ACK state is a predefined state for performing combining on the received DL data and requesting not to change a RV (Redundancy Version) value.

2. The method according to claim 1, wherein the HARQ-ACK state is ACK if all code blocks belonging to corresponding code block groups are successfully decoded, or negative acknowledgement (NACK) if at least one code block belonging to the corresponding code block groups fails to decode.

3. The method according to claim 1, wherein the cell is a cell on which a reference signal used for measurement of the cell is aperiodically received.

4. A user equipment (UE) for performing hybrid automatic repeat request (HARQ)-acknowledgement (ACK) feedback, the UE comprising:
   a transceiver configured to receive or transmit a signal; and
   a processor configured to:
   control the transceiver to receive DL data including a plurality of codewords through a physical downlink shared channel (PDSCH) according to the DCI, and
   indication information indicating that the plurality of codewords are divided into one or more code block groups;
   measure an interference level using the received DL data;
   configure a HARQ-ACK state if the measured interference level exceeds a specific threshold; and
   control the transceiver to transmit, to a base station (BS), a HARQ-ACK feedback for the received DL data based on the HARQ-ACK state,
   wherein the HARQ-ACK feedback is generated for each of the one or more code block groups based on the received indication information, and
   wherein the HARQ-ACK state is a predefined state for performing combining on the received DL data and requesting not to change a RV (Redundancy Version) value.

5. The UE according to claim 4, wherein the HARQ-ACK state is ACK if all code blocks belonging to corresponding code block groups are successfully decoded, or negative acknowledgement (NACK) if at least one code block belonging to the corresponding code block groups fails to decode.

6. The UE according to claim 4, wherein the cell is a cell on which a reference signal used for measurement of the cell is aperiodically received.

* * * * *